US010581608B2

(12) United States Patent
Brook et al.

(10) Patent No.: US 10,581,608 B2
(45) Date of Patent: Mar. 3, 2020

(54) WEARABLE DEVICE PAIRING WITH OPTICAL CODES

(71) Applicant: Snap Inc., Venice, CA (US)

(72) Inventors: Peter Brook, Marina del Rey, CA (US); Nicolas Dahlquist, Venice, CA (US); Matthew Hanover, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 127 days.

(21) Appl. No.: 15/716,164

(22) Filed: Sep. 26, 2017

(65) Prior Publication Data

US 2018/0091304 A1 Mar. 29, 2018

Related U.S. Application Data

(60) Provisional application No. 62/399,901, filed on Sep. 26, 2016.

(51) Int. Cl.
*H04L 9/32* (2006.01)
*G06K 7/10* (2006.01)
(Continued)

(52) U.S. Cl.
CPC ........ *H04L 9/3226* (2013.01); *G06K 7/10762* (2013.01); *G06K 19/10* (2013.01);
(Continued)

(58) Field of Classification Search
CPC ..... H04L 9/3226; H04L 63/083; H04L 63/61; H04L 63/0823; H04L 43/10;
(Continued)

(56) References Cited

U.S. PATENT DOCUMENTS 6,038,295 A 3/2000 Mattes
6,980,909 B2 12/2005 Root et al.
(Continued)

FOREIGN PATENT DOCUMENTS

CA 2887596 A1 7/2015
CN 109791621 A 5/2019
WO 2018058127 3/2018

OTHER PUBLICATIONS

Eunah Kim, et al., Providing secure mobile device pairing based on visual confirmation, May 25-28, 2009, 2009 IEEE 13th International Symposium on Consumer Electronics, pp. 1-5.*
(Continued)

*Primary Examiner* — Abu S Sholeman
*Assistant Examiner* — Raied A Salman
(74) *Attorney, Agent, or Firm* — Schwegman Lundberg & Woessner, P.A.

(57) ABSTRACT

Embodiments for device pairing using optical codes are described. One embodiment is a host device with a memory and one or more processors configured to pair the host device with a wearable device. The paring involves generating and displaying an image including a first optical code, decoding decode a pairing advertisement from the wearable device, generating a second optical code, the second optical code comprising a host pairing advertisement code, and decoding a second pairing advertisement including the host pairing advertisement code. Additional embodiments involve, in response to the second pairing advertisement, establishing a communication channel between the host device and the wearable device, communicating keys between the host and wearable device, and using an application-level elliptic curve Diffie-Hellman (ECDH) exchange with the first key and the second key to establish a shared secret.

20 Claims, 16 Drawing Sheets

(51) Int. Cl.

| | |
|---|---|
| ***G06K 19/10*** | (2006.01) |
| ***H04B 10/114*** | (2013.01) |
| ***H04L 9/08*** | (2006.01) |
| ***H04L 9/14*** | (2006.01) |
| ***H04L 9/30*** | (2006.01) |
| ***H04W 12/04*** | (2009.01) |
| ***H04W 12/06*** | (2009.01) |
| *G06K 7/14* | (2006.01) |

(52) U.S. Cl.

CPC .......... *H04B 10/114* (2013.01); *H04L 9/0844* (2013.01); *H04L 9/14* (2013.01); *H04L 9/3066* (2013.01); *H04W 12/04* (2013.01); *H04W 12/06* (2013.01); *G06K 7/1413* (2013.01); *G06K 7/1417* (2013.01); *H04L 2209/80* (2013.01)

(58) Field of Classification Search

CPC ....... H04L 9/0844; H04L 9/14; H04L 9/3066; H04L 2209/80; G06F 21/64; G06F 21/55; G06F 11/3051; G06K 7/1443; G06K 7/1417; G06K 7/1456; G06K 7/10762; G06K 7/1413; G06K 19/10; H04B 10/114; H04W 12/04; H04W 12/06

USPC .......................................................... 713/171

See application file for complete search history.

(56) References Cited

U.S. PATENT DOCUMENTS

| | | | |
|---|---|---|---|
| 7,173,651 | B1 | 2/2007 | Knowles |
| 7,411,493 | B2 | 8/2008 | Smith |
| 7,535,890 | B2 | 5/2009 | Rojas |
| 8,131,597 | B2 | 3/2012 | Hudetz |
| 8,199,747 | B2 | 6/2012 | Rojas et al. |
| 8,332,475 | B2 | 12/2012 | Rosen et al. |
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Roote et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,111,164 | B1 * | 8/2015 | Anderton ............. G06K 7/1443 |
| 9,191,776 | B2 | 11/2015 | Root et al. |
| 9,204,252 | B2 | 12/2015 | Root |
| 9,381,420 | B2 * | 7/2016 | Burroughs .......... G06F 19/3481 |
| 9,443,227 | B2 | 9/2016 | Evans et al. |
| 9,489,661 | B2 | 11/2016 | Evans et al. |
| 9,491,134 | B2 | 11/2016 | Rosen et al. |
| 9,668,217 | B1 * | 5/2017 | Bamberger ....... H04W 52/0229 |
| 9,678,338 | B1 * | 6/2017 | Bamberger ............ G02B 27/01 |
| 10,045,214 | B2 | 8/2018 | Weast |
| 2011/0202598 | A1 | 8/2011 | Evans et al. |
| 2012/0209924 | A1 | 8/2012 | Evans et al. |
| 2014/0207591 | A1 * | 7/2014 | Acker, Jr. .......... G06Q 30/0633 705/21 |
| 2015/0222517 | A1 * | 8/2015 | McLaughlin ........... H04W 4/70 713/156 |
| 2015/0286976 | A1 | 10/2015 | Hirschfeld et al. |
| 2016/0180072 | A1 | 6/2016 | Ligatti et al. |
| 2016/0350922 | A1 * | 12/2016 | Tofolo ...................... G06T 7/20 |
| 2017/0041309 | A1 * | 2/2017 | Ekambaram ............ G06F 21/64 |
| 2017/0086015 | A1 | 3/2017 | Elkehag |
| 2017/0140791 | A1 | 5/2017 | Das et al. |
| 2017/0374414 | A1 | 12/2017 | Knox |
| 2018/0091303 | A1 | 3/2018 | Brook et al. |
| 2018/0300364 | A1 | 10/2018 | Xu |

OTHER PUBLICATIONS

Flanagan, Pairing devices using QR-Codes, Apr. 24, 2013, https://www.qrcode.es/en/pairing-devices-using-qr-codes/, pp. 1-3.*

U.S. Appl. No. 15/716,124, filed Sep. 26, 2017, Systems and Methods for Device Pairing With Optical Codes.

"International Application Serial No. PCT/US2017/053509, International Search Report dated Dec. 13, 2017", 5 pgs.

"International Application Serial No. PCT/US2017/053509, Written Opinion dated Dec. 13, 2017", 5 pgs.

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

Liu, Sha, et al., "A novel asymmetric three-party based authentication scheme in wearable devices environment", Journal of Network and Computer Applications Academic Press New York NY US vol. 60, (Oct. 31, 2015), 144-154.

"U.S. Appl. No. 15/716,124, Non Final Office Action dated Apr. 1, 2019", 80 pgs.

"International Application Serial No. PCT/US2017/053509, International Preliminary Report on Patentability dated Apr. 4, 2019", 7 pgs.

* cited by examiner

200

WEARABLE DEVICE PAIRING WITH OPTICAL CODES

PRIORITY CLAIM

This application claims the benefit of priority of U.S. Provisional Application Ser. No. 62/399,901, filed on Sep. 26, 2016, which is hereby incorporated by reference herein in its entirety.

TECHNICAL FIELD

Embodiments of the present disclosure relate generally to device communications, and particularly to the use of optical communications for pairing of a wearable device (e.g. smart glasses) with a host device (e.g. a smart phone).

BACKGROUND

Eyewear, especially those carrying onboard electronics, can be bulky with significant size and weight tradeoffs associated with communication, battery, and charging systems, making them difficult to wear and charge. Additionally, given limited onboard resources, including limited interface elements, establishing secure communication links can be difficult.

BRIEF DESCRIPTION OF THE SEVERAL VIEWS OF THE DRAWINGS

To easily identify the discussion of any particular element or act, the most significant digit or digits in a reference number refer to the figure ("FIG.") number in which that element or act is first introduced.

DETAILED DESCRIPTION

Figure 1A:
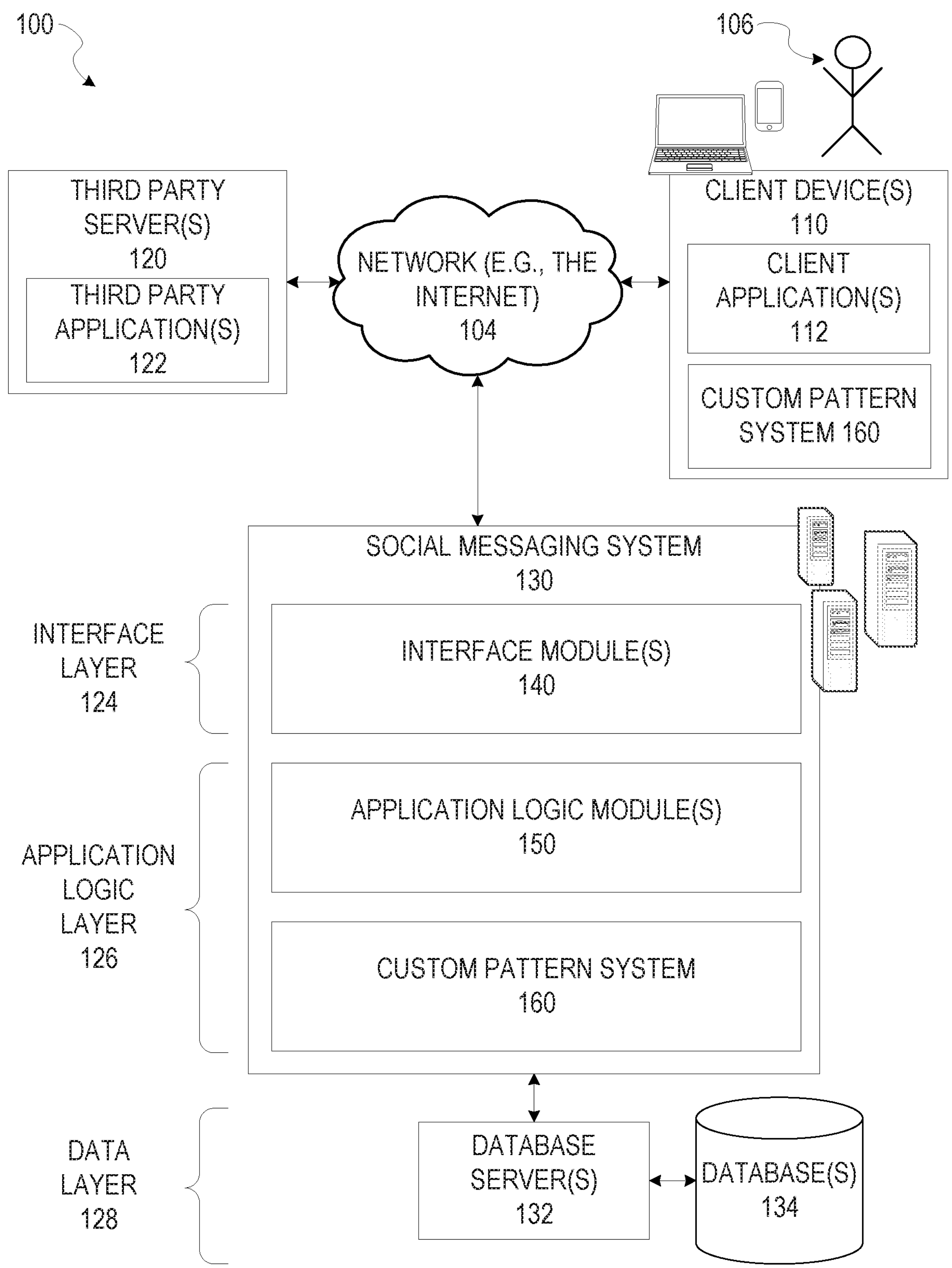
FIG. 1A is a block diagram showing an example messaging system for exchanging data (e.g., messages and associated content) over a network, in accordance with some embodiments.

The description that follows includes systems, methods, techniques, instruction sequences, and computing machine program products as illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Quick Response (QR) codes, and other optical barcodes, are a convenient way to share small pieces of information to users of mobile devices, wearable devices, and other smart devices. Embodiments described herein use optical codes for pairing a wearable device with a host device. Wearable devices generally have limited battery and processing resources. For wearable devices that include a camera, the function of the camera and quick camera response times are often a key user preference, while wireless data transfer and communications may be secondary. In such an environment, the use of optical codes to initiate secure device pairing provides benefits related to the use of the camera as prioritized over the use of wireless communications. Additionally, since optical code processing may be part of a wearable device, the use of these processing features may not involve a large use of additional wearable device resources.

Embodiments described herein may operate where a host device (e.g., smart phone) displays an optical code, and a wearable device captures an image of the optical code. The wearable device processes the code, and then in response, broadcasts a wireless pairing signal. Any local host device can receive the pairing signal and generate a second optical code based on the pairing signal. The wearable device then captures the second optical code and uses information from the second optical code to establish a secure wireless connection, which is used for secure handshaking.

Further, some embodiments may use specialized optical codes. Typically, an optical barcode uses a finder pattern for identification of the optical barcode. Conventional finder patterns commonly use multiple generic markings conspicuously placed within the optical barcode. Such conspicuous and generic markings can be unsightly and often serve no purpose other than to function as a finder pattern.

QR codes, and other optical barcodes (e.g., Universal Product Code (UPC) barcodes, Aztec code, Data Matrix, Dataglyph, MaxiCode, PDF417, Ultra Code), are a convenient way to share small pieces of information with users of mobile devices, wearable devices, and other smart devices. For instance, QR codes are two-dimensional optical barcodes that encode information readable by a device (e.g., a smart phone) equipped with a camera sensor. Typically, a QR code includes one or more functional patterns, such as a finder pattern, used for identification and recognition of the QR code or an alignment pattern used to facilitate decoding. Conventional finder patterns comprise multiple markings that are generic in design such as square marks placed in all corners except the bottom right corner (as is the case with a QR code). These finder patterns are absent aesthetic elements such as curves, non-uniformities, and other stylistic elements and often conform to a particular standard to promote open use of the optical barcode.

Embodiments described herein relate to the use of such codes for secure pairing of two electronic devices. For example, a phone may display an optical code, and a camera on a peripheral device (e.g. glasses or other wearable device) captures the optical code, and then uses the optical code as part of a set of wireless pairing communications to establish a secure wireless link between the two devices. In various example embodiments, an optical barcode that uses custom or non-standard functional patterns provides users with an aesthetically pleasing, branded barcode that allows for an exclusive experience associated with the optical barcode. For example, an entity logo (e.g., a logo of a company, organization, or individual) can be used as a finder pattern and, in some instances, an alignment pattern, to create a branded and exclusive optical barcode that is machine-readable using software provided by the entity.

In some embodiments, once a wearable device is paired with a host device, images captured by the wearable device are locked to the paired account and may only be transferred to devices associated with the account or uploaded to a network using an account associated with the host device at the time of the pairing. If a wearable device is paired with a new host associated with a new account, new content becomes associated with the new account. In some embodiments, old content is automatically secured or deleted. If the content is secured, it may be released by pairing with a host device associated with the old account. In some embodiments, user selectable options may enable such account locking or may enable removal of such account locking such that any content may be shared with any account or host device.

Further, in some embodiments, a wearable device maintains reserve resources to perform the analysis of a custom pattern system in order to enable pairing even when the memory of the device has reached a critical level. For example, a pair of glasses with a camera system may include memory to store images and video captured by the camera system. Due to the size and structure of the wearable device, the available memory may be limited. When a threshold amount of memory is used, the device returns an error indicating that the memory is full and unavailable to capture additional content (e.g., images or videos.) In such a state, the device maintains a memory reserve to capture and process details of images to determine if an optical code indicating a device pairing is in use. This enables the device to pair with a host device for wireless transfer of content data to the host device and to free up the memory.

FIG. 1A is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects associated with the network system 100 and its users. Although illustrated herein as client-server architecture, other embodiments may include other network architectures, such as peer-to-peer or distributed network environments.

As shown in FIG. 1A, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1A represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1A. In some embodiments, additional functional modules and engines may be used with a social messaging system, such as that illustrated in FIG. 1A, to facilitate additional functionality that is not specifically described herein. Furthermore, the various functional modules and engines depicted in FIG. 1A may reside on a single server computer or may be distributed across several server computers in various arrangements. Moreover, although the social messaging system 130 is depicted in FIG. 1A as a three-tiered architecture, the inventive subject matter is by no means limited to such an architecture.

As shown in FIG. 1A, the interface layer 124 consists of interface modules (e.g., a web server) 140, which receive requests from various client-computing devices and servers, such as client devices 110 executing client applications 112, and third party servers 120 executing third party applications 122. In response to received requests, the interface modules 140 communicate appropriate responses to requesting devices via a network 104. For example, the interface modules 140 can receive requests such as Hypertext Transfer Protocol (HTTP) requests or other web-based Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client devices 110 are executing the client applications 112. The client applications 112 can provide functionality to present information to a user 106 and communicate via the network 104 to exchange information with the social messaging system 130. Each of the client devices 110 can comprise a computing device that includes at least a display and communication capabilities with the network 104 to access the social messaging system 130. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini computers, and the like. Users 106 can include a person, a machine, or other means of interacting with the client devices 110. In some embodiments, the users 106 interact with the social messaging system 130 via the client devices 110.

As shown in FIG. 1A, the data layer 128 has one or more database servers 132 that facilitate access to information storage repositories or databases 134. The databases 134 are storage devices that store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic modules 150, which, in conjunction with the interface modules 140, generate various user interfaces with data retrieved from various data sources or data services in the data layer 128. Individual application logic modules 150 may be used to implement the functionality associated with various applications, services, and features of the social messaging system 130. For instance, a social messaging application can be implemented with one or more of the application logic modules 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is an ephemeral message accessible to a message recipient for a predefined duration (e.g., specified by a message sender) that begins when the particular message is first accessed. After the predefined duration elapses, the message is deleted and is no longer accessible to the message recipient. The system may manage deletion of such an ephemeral message based on an ephemeral message deletion trigger that is generated by the device capturing and sending the image, or by the system.

As illustrated in FIG. 1A, the social messaging system 130 or the client applications 112 include a custom pattern system 160 that provides functionality to identify and decode optical barcodes that employ custom functional patterns. In various embodiments, the custom pattern system 160 can be implemented as a standalone system and is not necessarily included in the social messaging system 130. In some embodiments, the client devices 110 include a portion of the custom pattern system 160 (e.g., a portion of the custom pattern system 160 may be included independently or in the client applications 112). In embodiments where the client devices 110 include a portion of the custom pattern system 160, the client devices 110 can work alone or in conjunction with the portion of the custom pattern system 160 included in a particular application server or included in the social messaging system 130.

Figure 1B:
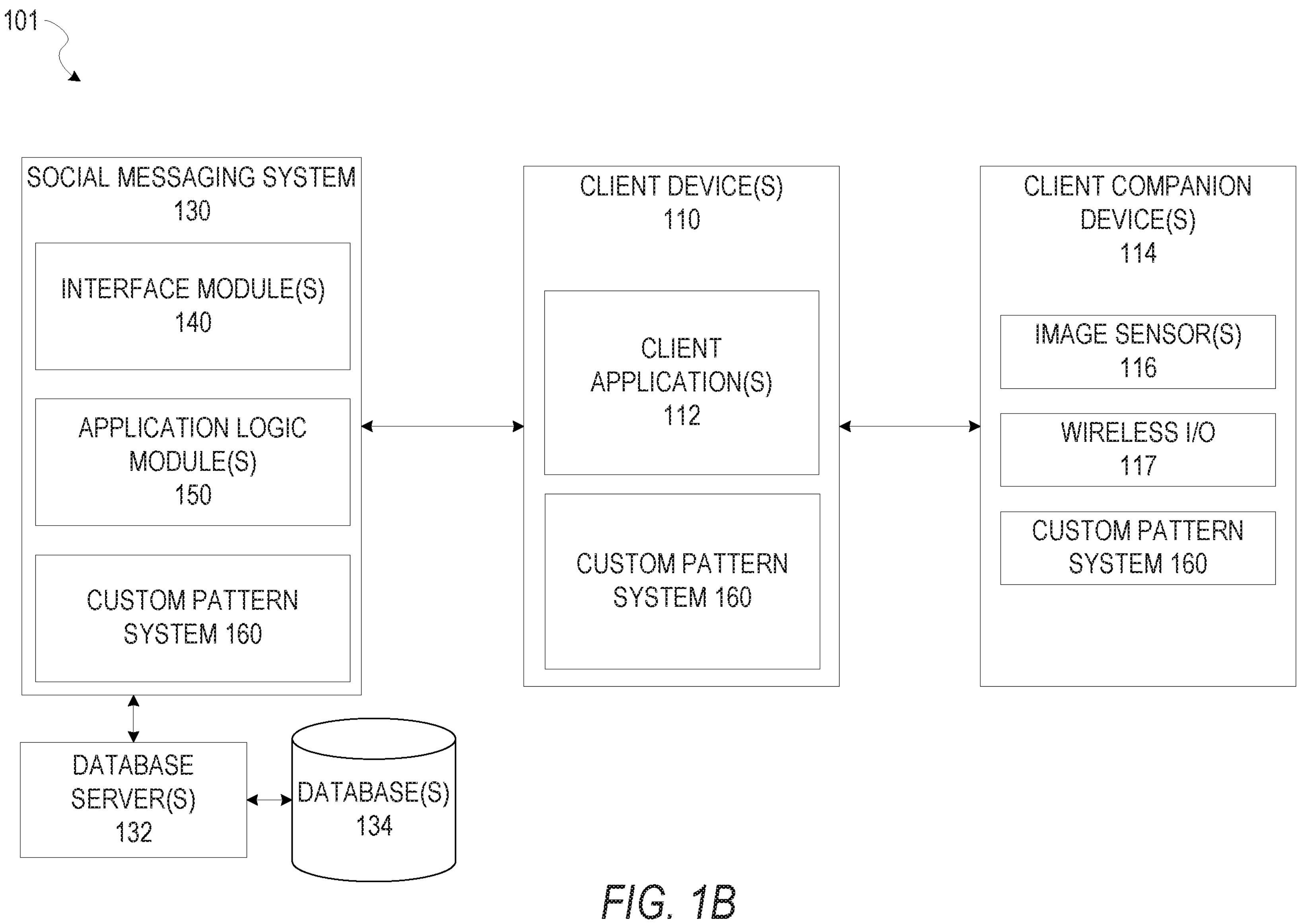
FIG. 1B is a block diagram showing an example messaging system for exchanging data (e.g., messages and associated content) over a network with a wearable device (e.g. companion) via a client device (e.g. host), in accordance with some embodiments.

FIG. 1B illustrates an alternative network system 101 that may be used with certain embodiments. Network system 101 includes social messaging system 130 with interface modules 140, application logic modules 150, database servers 132, and databases 134, as well as client devices 110 operating client applications 112, just as in network system 100. Network system 101, however, additionally includes client companion devices 114 connected to client devices 110. Client companion devices 114 may be wearable devices such as glasses, visors, watches, or other network enabled items. Client companion devices may also be any device described herein that accesses a network such as network 104 via another device such as client device 110. Client companion devices 114 include image sensors 116, wireless input and output (I/O) 117, and elements of custom pattern system 160. Client companion devices 114 may include one or more processors, a display, a battery, and a memory, but may have limited processing and memory resources. In such embodiments, client device 110 and/or server computing devices used for social messaging system 130 may be used via network connections to provide remote processing and memory resources for client companion devices 114. In one embodiment, for example, client companion device 114 may be a pair of network enabled glasses, such as the glasses of FIG. 13. In order to provide security for wireless I/O 117 in communication with client device 110, custom pattern system 160 may interact with image sensors 116 to identify optical patterns as part of secure pairing operations as detailed below.

Figure 2:
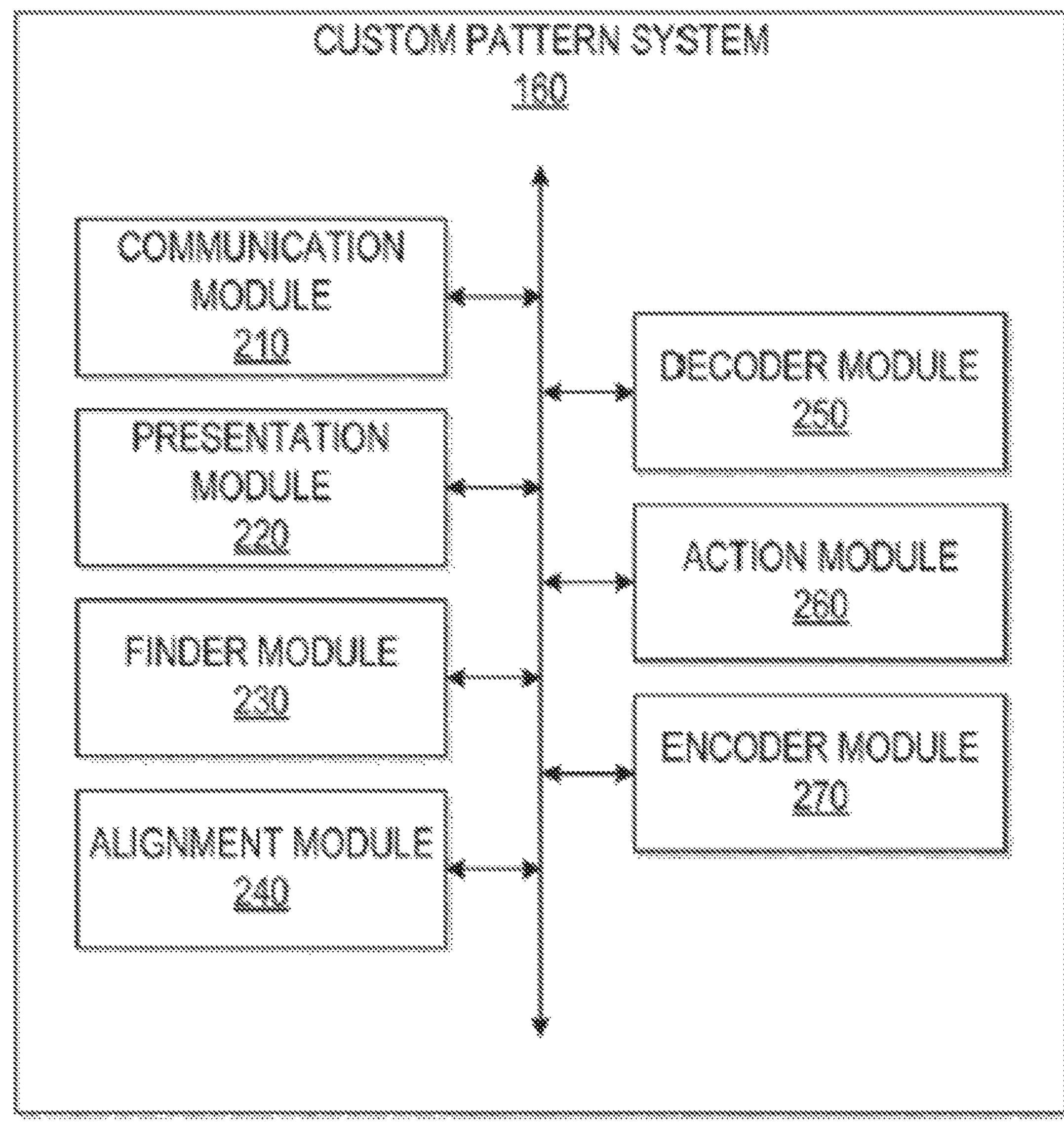
FIG. 2 illustrates a system for recognizing optical codes, in accordance with some embodiments.

FIG. 2 is a block diagram 200 of the custom pattern system 160. The custom pattern system 160 is shown to include a communication module 210, a presentation module 220, a finder module 230, an alignment module 240, a decoder module 250, an action module 260, and an encoder module 270. All, or some, of the modules 210-270 communicate with each other, for example, via a network coupling, shared memory, and the like. Each module of the modules 210-270 can be implemented as a single module, combined into other modules, or further subdivided into multiple modules. Other modules not pertinent to example embodiments can also be included, but are not shown.

The communication module 210 provides various communications functionality. For example, the communication module 210 receives, accesses, or otherwise obtains image data of an image from a user device. In a specific example, the communication module 210 receives substantially real-time image data from a camera sensor of a smart phone (e.g., a single frame of image data or a continuous stream of frames captured by a camera sensor of the smart phone). The communication module 210 exchanges network communications with the database servers 132, the client devices 110, and the third party servers 120. The information retrieved by the communication module 210 includes data associated with the user (e.g., member profile data from an online account or social network service data) or other data to facilitate the functionality described herein.

The presentation module 220 provides various presentation and user interface functionality operable to interactively present and receive information to and from the user. For instance, the presentation module 220 is utilizable to present user interfaces generated in response to decoding the optical barcode. In other instances, the presentation module 220 generates user interfaces that include optical barcode(s). In various embodiments, the presentation module 220 presents or causes presentation of information (e.g., visually displaying information on a screen, acoustic output, haptic feedback). The process of interactively presenting information is intended to include the exchange of information between a particular device and the user. The user may provide input to interact with the user interface in many possible manners, such as alphanumeric, point based (e.g., cursor), tactile, or other input (e.g., touch screen, tactile sensor, light sensor, infrared sensor, biometric sensor, microphone, gyroscope, accelerometer, or other sensors). The presentation module 220 provides many other user interfaces to facilitate functionality described herein. The term "presenting" as used herein is intended to include communicating information or instructions to a particular device that is operable to perform presentation based on the communicated information or instructions.

The finder module 230 provides image processing functionality to identify, recognize, or detect the custom graphic being employed as a finder pattern in the optical barcode. For example, the finder module 230 extracts and analyzes candidate shape features or candidate contour characteristics from image data of the image received from the user device (e.g., the client devices 110). The finder module 230 determines satisfaction of various rules or criteria associated with the extracted candidate shape features. The finder module 230 compares the extracted candidate shape features with reference shape features of the custom graphic, or another reference image, to identify the custom graphic included in the image. The finder module 230 can employ a wide variety of schemes and techniques to extract the candidate shape features from the image data of the image and subsequently identify the custom graphic based on an analysis of the candidate shape features.

The alignment module 240 provides image processing functionality to determine an alignment of the optical barcode using the custom graphic. The custom pattern system 160 can use the alignment to facilitate decoding of data encoded in the optical barcode. In this way, the custom graphic functions as an alignment pattern for the optical barcode. For example, the alignment module 240 extracts spatial attributes of the custom graphic in the image from the image data. In various embodiments, the spatial attributes include at least one of position, orientation, scale, or another spatial aspect of the optical barcode. The alignment module 240 determines an alignment of the optical barcode based on the spatial attributes (e.g., a particular orientation of the optical barcode). In an example, the alignment module 240 can determine an alignment including position and orientation based on the spatial attributes and generate a transformed image according to the alignment. The custom pattern system 160 can then use the transformed image to decode data encoded in a portion of the transformed image.

The decoder module 250 provides functionality to decode data encoded in the image using the spatial attributes or the determined alignment of the custom graphic in the image. For instance, the decoder module 250 can decode the data encoded in the image from an image transformed according to the spatial attributes of the custom graphic extracted from image data. In an embodiment, the decoder module 250 detects markings (e.g., high contrast dots, squares, or other marks in the image) representing data encoded in a portion of the image from the image data. In a specific example, the decoder module 250 employs a Reed-Solomon error correction scheme to decode data encoded in the image. The Reed-Solomon error correction scheme allows for a successful or valid decoding even when a certain percentage of data could not be decoded from the optical barcode (e.g., damaged bits or incorrectly decoded bits). In some embodiments, the user or an administrator of the custom pattern system 160 configures a tolerance value for an amount of damaged or incorrectly decoded data acceptable when decoding the optical barcode. In some embodiments, the decoder module 250 also provides image processing functionality to improve decoding of the optical barcode. For instance, the decoder module 250, as well as the alignment module 240, can perform image transforms of the image (e.g., perform image sharpening, de-noise processing, other digital filtering, or other image processing techniques to improve decoding accuracy).

The action module 260 provides functionality to perform a variety of actions based on decoding the data encoded in the image. For example, the data encoded in a portion of the image can indicate a particular action or include information to be used in conjunction with a particular action. In a specific example, the data encoded in a portion of the image can comprise a user name, or other user identification, of a member of a social networking service and based on decoding the user name, the action module 260 can perform an action on the social networking service corresponding to the user name (e.g., sending a message to the member associated with the user name). In some embodiments, the action module 260 performs an action specific to a particular app that scans the image (e.g., a function available to a user of the app but otherwise unavailable). In some instances, the action module 260 performs the action without communicating with an external server (e.g., an action locally performed on the user device that scanned the optical code).

The encoder module 270 provides functionality to generate and encode data into an optical barcode that employs the custom graphic as one or more functional patterns (e.g., generating optical codes). As discussed above in connection with the decoder module 250, in a specific example, the encoder module 270 can employ a technique such as Reed-Solomon error correction to encode data. In an example embodiment, the encoder module 270 renders a machine-readable arrangement of marks that represents the data to be encoded. The encoder module 270 can then generate the machine-readable optical barcode using the rendered arrangement of marks and the custom graphic to be used as a functional pattern.

In an example embodiment, a custom pattern system receives image data representing an image from a user device. For example, the custom pattern system receives the image data from an optical sensor (e.g., a camera sensor) of a smart phone of the user. In various embodiments, the image data from the user device is received in response to a user-initiated image capture, a periodic monitoring of image data being detected by the optical sensor of the user device, an access of stored image data, or a combination thereof. A portion of the image data can include data representing an optical barcode employing a custom graphic for a particular functional pattern (e.g., a finder pattern). In some scenarios, the image data includes extraneous or irrelevant data along with the data pertaining to the optical barcode (e.g., an image of an optical barcode includes a background that is not pertinent to decoding the optical barcode). In a specific example, the optical sensor of the user device captures an image of a promotional poster that includes a particular optical barcode. The image of the promotional poster can include the particular optical barcode along with irrelevant portions of the promotional poster or background that surrounds the particular optical barcode.

After the custom pattern system receives the image data, the custom pattern system searches the image data of the image for the custom graphic to determine whether the image includes the optical barcode. That is to say, the custom graphic is used as a finder pattern for recognition, identification, or detection of the optical barcode within the image. In an example embodiment, the custom pattern system searches for the custom graphic by extracting a candidate shape feature, or multiple candidate shape features, from the image data. For example, the custom pattern system performs an edge detection technique, or another image processing technique, to identify the candidate shape feature, such as a contour line of the image. The custom pattern system then determines whether the candidate shape feature satisfies shape feature rules or criteria. For instance, if a particular candidate shape feature is a contour line, the custom pattern system can determine whether the contour line is an enclosed line that encircles a portion of the image. Consistent with some embodiments, the shape feature rules filter out irrelevant or extraneous candidate shape features or candidate shape features with a low probability of being the custom graphic.

In response to the candidate shape feature satisfying the shape feature rules, the custom pattern system identifies the custom graphic by comparing the candidate shape feature with a reference shape feature of the custom graphic. For example, the custom pattern system can compare an area or size of the candidate shape feature with a reference area or size of the reference shape feature. In this example, the custom pattern system identifies the custom graphic based on a match or near match (e.g., a percentage match above a threshold) between the candidate shape feature and the reference shape feature. In this way, the custom pattern system uses the custom graphic as a finder pattern to identify the presence of the optical barcode within a portion of the image.

In further example embodiments, the custom graphic functions as an alignment pattern to facilitate the custom pattern system decoding the data encoded in the optical barcode. In an example embodiment, the custom pattern system extracts spatial attributes of the custom graphic in the image from the image data. For example, the custom pattern system extracts a position, scale, or orientation of the custom graphic from the image data. The custom pattern system decodes data encoded in the image from the image data using the spatial attributes of the custom graphic in the image. For instance, the custom pattern system can perform an image transform using the spatial attributes (e.g., a de-skew, a rotation, a scale, or another type of image transform) to improve detectability/readability of data encoded in a portion of the image. In this way, the custom pattern system uses the custom graphic as an alignment pattern to facilitate decoding the optical barcode.

Accordingly, the custom pattern system uses the custom graphic as a functional pattern of the optical barcode without utilizing conventional functional patterns. Using the custom graphic as a functional pattern allows for an aesthetically pleasing design and can provide exclusivity to a particular software application as the functional pattern does not necessarily conform to an open standard and thus is readable exclusively by the particular software application.

Figure 3A:
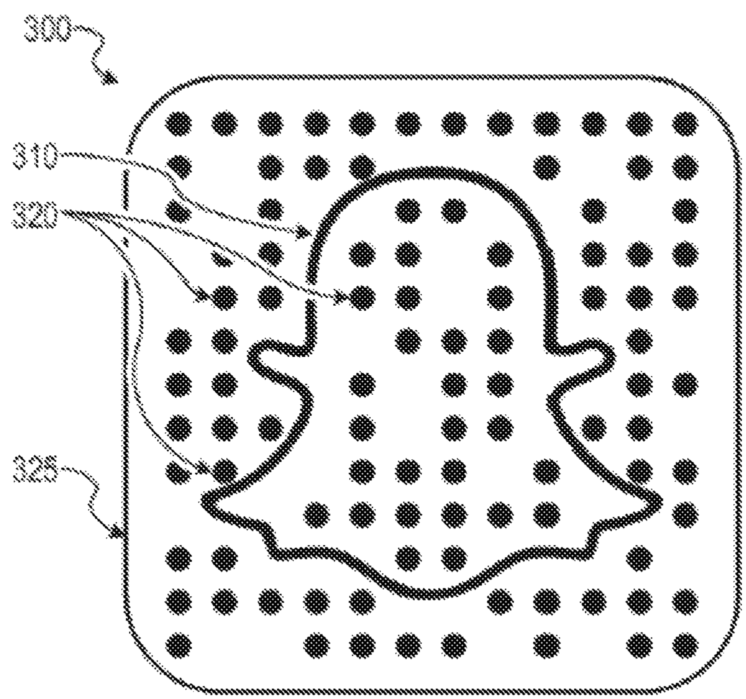
FIGS. 3A and 3B illustrate aspects of optical codes, in accordance with some embodiments.
Figure 3B:
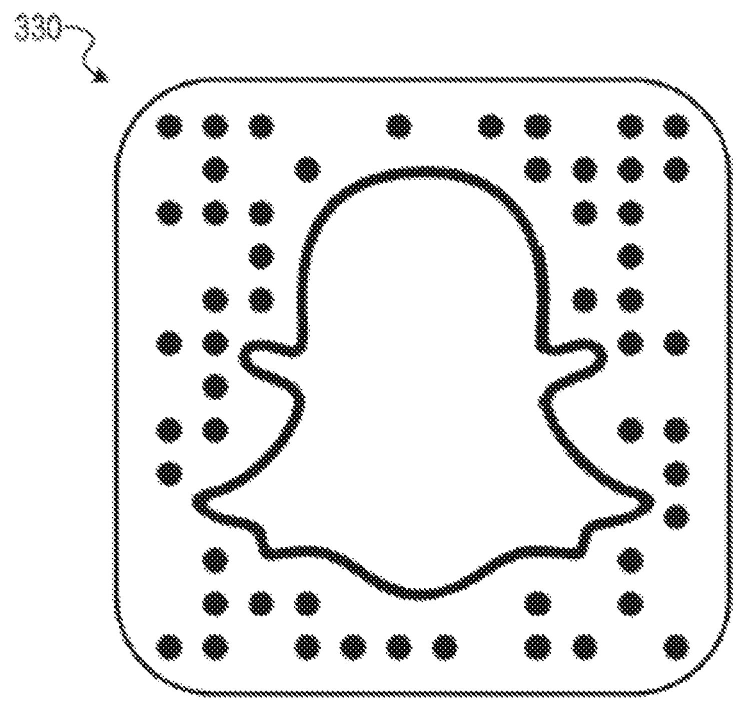

FIGS. 3A and 3B are diagrams illustrating examples of optical barcodes employing the custom graphic for a finder pattern or an alignment pattern (e.g., optical codes). Diagram 300 shows an example optical barcode that includes a custom graphic 310 (e.g., a company logo), and markings 320 that represent data encoded into the optical barcode. In this example, the custom graphic 310 is a company logo. Custom graphics used as a functional pattern can include designs with multiple paths, multiple polygons, multiple aesthetic elements, or other design features.

As shown in the diagram 300, the markings 320 are dots that are arranged in a pattern with a particular spacing or positioning readable by a machine. Although the diagram 300 shows the markings 320 as dots, other shapes and marks can be employed (e.g., squares or asymmetric shapes of various geometries). The markings 320 can be arranged in a uniform pattern or a non-uniform pattern. In some instances, the marks can be of different sizes or a uniform size. Additionally, the markings 320 can be in a predetermined arrangement or an arrangement that is dynamically determinable when decoding data from the markings. In some embodiments, the custom graphic 310 and the markings 320 can be surrounded by a bounding shape, such as an outer box 325. Although the outer box 325 of the diagram 300 is shown as a square with rounded corners, the outer box 325 can be in the form of a variety of other shapes with various geometries. Diagram 330 in FIG. 3B shows another example optical barcode that employs the custom graphic for a finder pattern or an alignment pattern. The diagram 330 shows the optical barcode with markings excluded from within the custom graphic. In these and other embodiments, the space internal to the custom graphic may be reserved for other uses. For example, a picture, graphic, animation, annotation, or image selected by a user may be inserted.

Figure 4A:
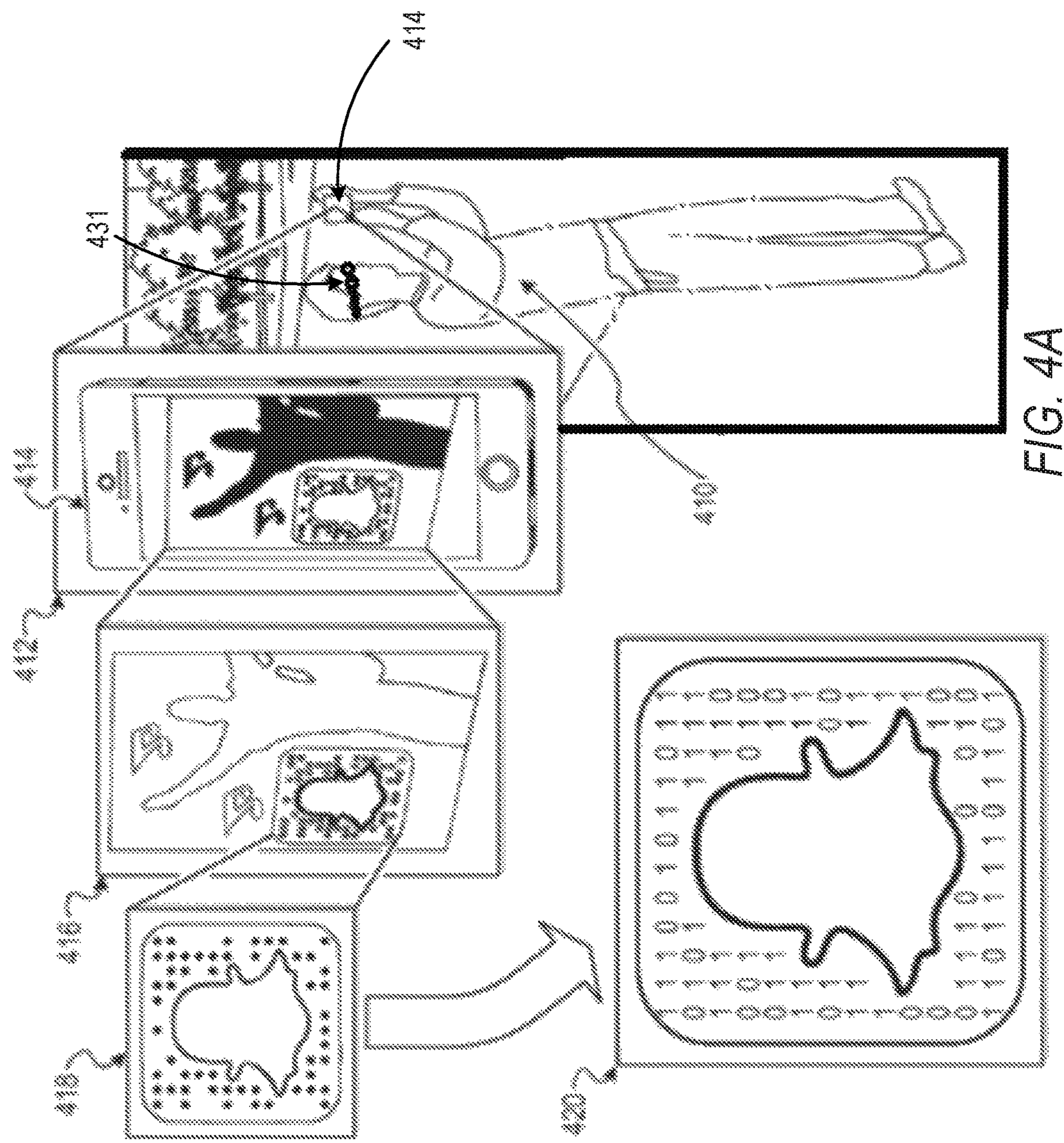
FIGS. 4A and 4B illustrate capture of optical codes using a wearable device, in accordance with some embodiments.
Figure 4B:
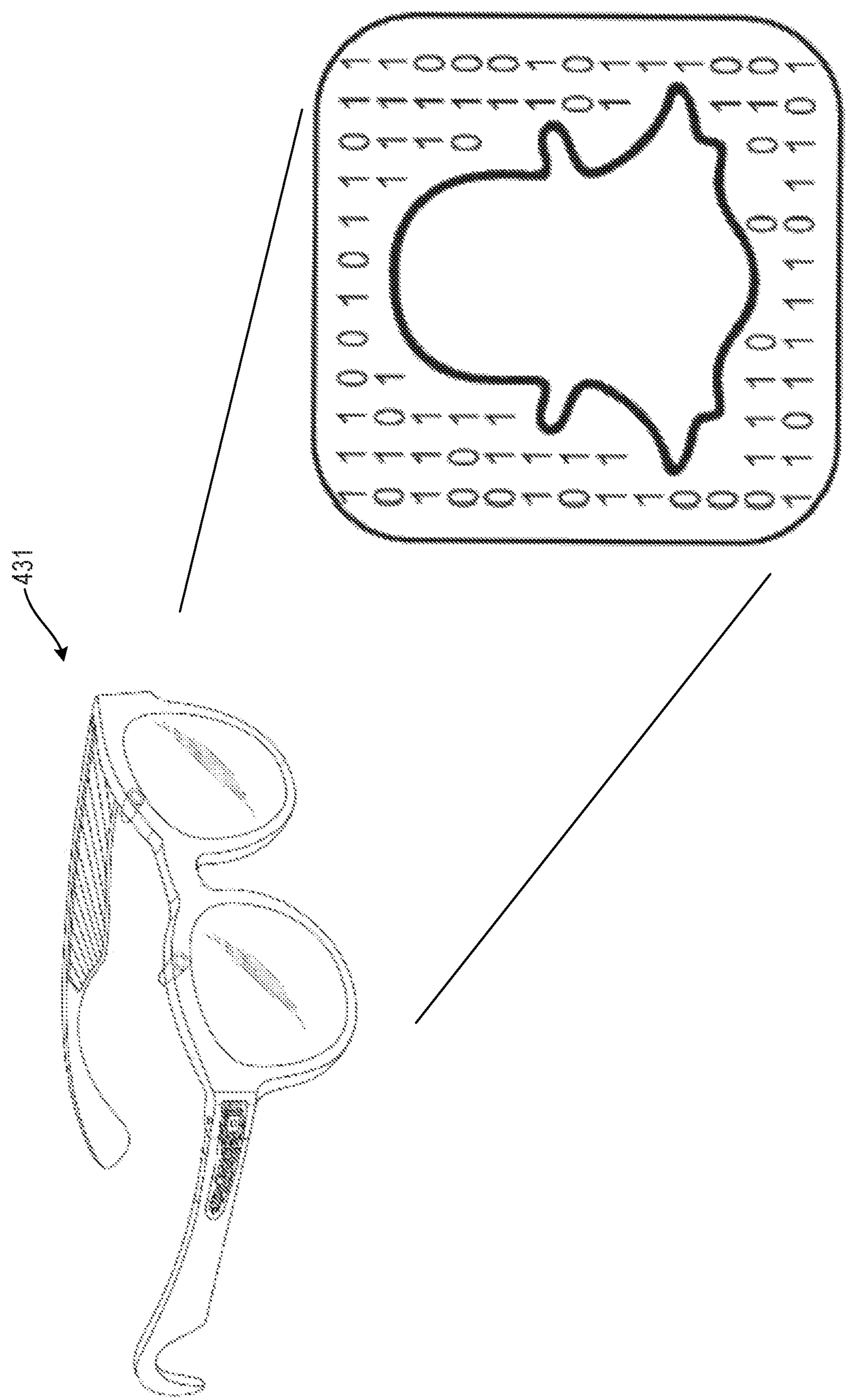

Turning now to FIG. 4A, a diagram illustrating an example of identifying and decoding the optical barcode employing the custom graphic for a finder pattern or an alignment pattern is shown. FIG. 4A is an overview of a particular example embodiment of identifying and decoding the optical barcode using the custom graphic. FIG. 4B illustrates a wearable device that may observe an optical code displayed on a host device in order to initiate pairing between the wearable device and the host device. Additional details and alternative implementations are discussed in connection with the figures to follow. In FIGS. 4A and 4B, a host device 414 displays an optical barcode. A user 410 wearing a wearable device 431 may use sensors of wearable device 431 to capture an image including optical barcode, as presented on a display of device 414. Callout 412 portrays an enlarged view of a portion of the scene captured by the sensors of wearable device 431 that includes the optical barcode from the display of device 414 in at least a portion of the scene.

In an example embodiment, the user device 414 captures an image of the scene that includes the optical barcode as displayed on the host device. The custom pattern system 160 receives the image data representing the image from the user device 414. In this example embodiment, the custom pattern system 160 is included in the wearable device 431 and in the device 414, where the device 414 uses the custom pattern system 160 to generate an optical barcode and display it, and device 431 uses custom pattern system 160 to identify the barcode generated by device 414 (e.g., applications executing on glasses and a smart phone of the user 410). Callout 416 portrays example image processing performed by the finder module 230 to identify the custom graphic in the image and use the custom graphic as an alignment pattern for decoding data included in the optical barcode. In the callout 416, the finder module 230 extracts candidate shape features from the image data of the image. Subsequently, the finder module 230 determines if the candidate features meet certain rules and criteria to filter out irrelevant shape features or shape features that have a low probability of being the custom graphic. The finder module 230 can then compare the candidate shape features that meet the shape feature criteria or rules with reference shape features of the custom graphic. In an example, the finder module 230 identifies the custom graphic based on a match between the candidate shape features and the reference shape feature (e.g., a match score that exceeds a threshold).

Subsequent to the finder module 230 identifying the custom graphic, the custom pattern system 160 can use the custom graphic as an alignment pattern for decoding. For instance, the alignment module 240 extracts spatial attributes of the custom graphic in the image and compares the extracted spatial attributes to reference spatial attributes to determine an alignment of the custom graphic. The alignment module 240 or the decoder module 250 may then generate a transformed image of the image according to the alignment (e.g., a rotation or de-skew) as shown in callout 418. After generating the transformed image, the decoder module 250 decodes the data encoded in a portion of the transformed image as shown in callout 420. In the callout 420, the dots of the optical barcode are transformed into data shown as ones for dots and zeros for non-dots, although this is merely an illustrative example and other schemes can be employed. In this way, the custom pattern system 160 uses the custom graphic included in the optical barcode as one or more functional patterns such as a finder pattern or an alignment pattern.

Figure 5:
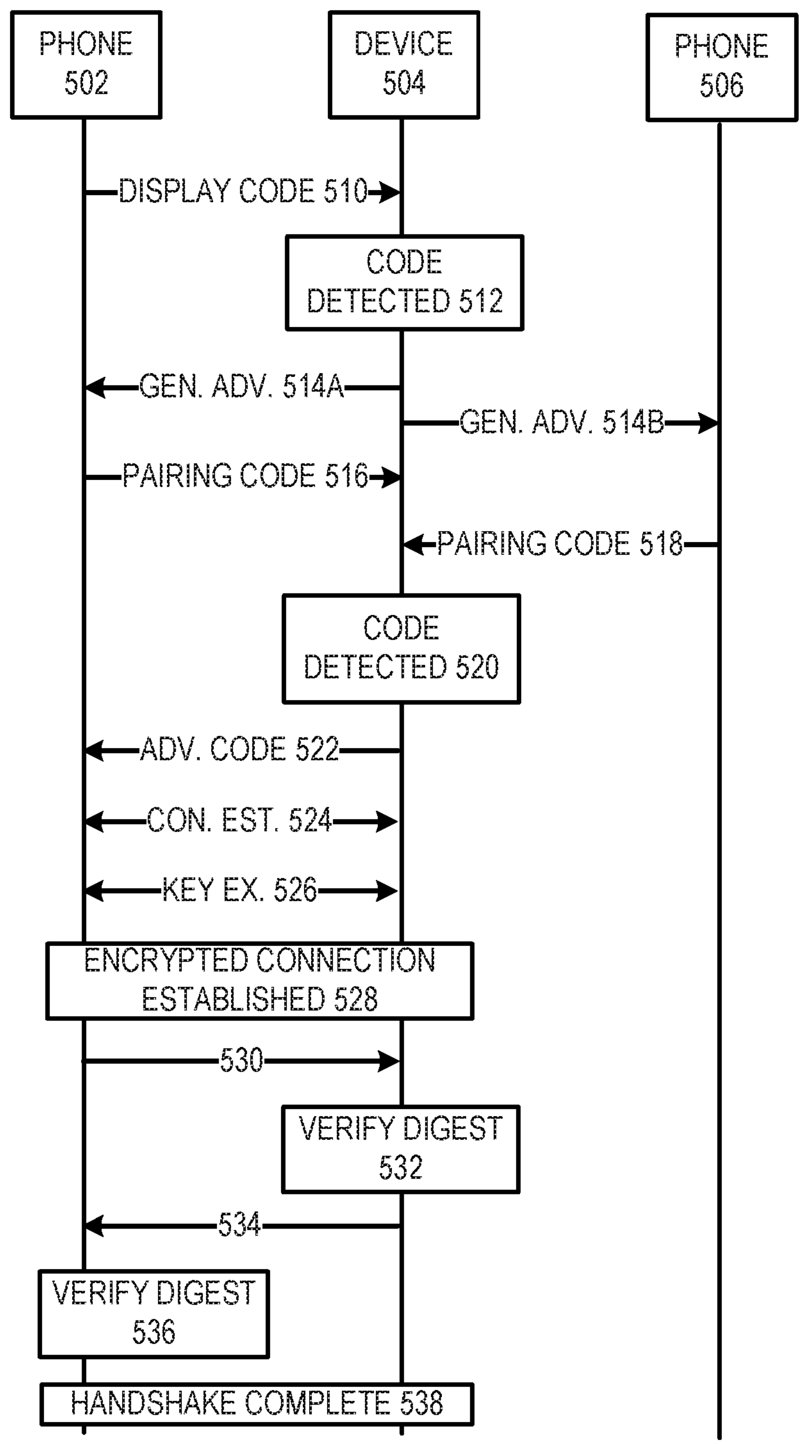
FIG. 5 illustrates a system for secure device pairing using optical codes, in accordance with some embodiments.

FIG. 5 then describes details of one embodiment for device pairing, in accordance with embodiments described herein. FIG. 5 illustrates operations and communications performed by a phone 502 (e.g., a host device), a wearable device 504, and a phone 506 (e.g., a miscellaneous local or secondary host device). In the embodiment of FIG. 5, in an application operating on a host device phone 502, a user navigates to a profile page or otherwise interacts with phone 502 such that phone 502 displays an optical code in operation 510. The device 504 then records video or captures an image using the wearable device 504, where the captured content includes an image of the optical code being displayed by phone 502. The wearable device detects the optical code in operation 512, and begins advertising (e.g., broadcasting wireless data) in operations 514A/B. In some embodiments, this broadcasting is performed using Bluetooth Low Energy™.

Any host devices (e.g., smartphones) nearby, such as phone 506, that are executing the application and are in a state to detect a generic advertisement message (e.g., at a profile screen) will detect the advertisement communication, and then display a special pairing optical code. In some embodiments, this may be a different size or shape that the initial optical code (e.g., 9×9 vs. 18×18). In some embodiments, the pairing optical code includes 20 random bits used as a verification code, 10 randomly generated bits for advertisement code, and 10 error correction bits. In FIG. 5, phone 502 and 506 both receive the generic advertising message (e.g., a message not customized for a specific host device or phone) and respond with operations 516 and 518 where each phone displays a pairing code (e.g., a second optical code).

Each phone 502 and 506 then begins scanning for additional advertisement communications that match the advertisement code from the pairing optical code while displaying the pairing codes of operations 516 and 518.

The wearable device then captures and decodes the pairing optical code from operation 516 using the image sensor, in operation 520. This may be similar to the capture and decoding of the profile optical code. The wearable device ignores the paring code from operation 518 from phone 506. The wearable device advertising communication is then updated to include the advertisement code from the pairing optical code displayed by the host device in operation 522. The host device phone 502 that has been scanning for the matching advertisement identifies that the wearable device is broadcasting the matching advertisement code, and then allows the connection between the host device and the wearable device in operation 524. Phone 506 may receive the advertisement code of operation 522, but will not match the details from pairing code operation 518, and so will ignore the code of operation 522, and will continue scanning until the user of 506 navigates away from the profile page or otherwise shifts to a state without scanning for advertising codes.

In some embodiments, the wearable device and host device then carry out an application-level elliptic curve Diffie-Hellman (ECDH) exchange in operation 526 to establish a shared secret (e.g. Diffie-Hellman key (DHKey)). Further communications are then encrypted via counter mode encryption using this shared secret in operations 528. In some embodiments, the host device application computes a hash message authentication code (HMAC) based on SHA-256 of DHKey, Rv and a hardcoded 128-bit SaltA. The application sends this from the host device phone 502 to the wearable device 504 in operation 530, and the wearable device 504 verifies that this matches the expected value or is otherwise correct in operation 532.

In some embodiments, the wearable device further computes the HMAC based on SHA-256 of DHKey, Rv and a hardcoded 128-bit SaltB. The wearable device then sends this to the host device in operation 534, and the application on the host device verifies that this matches the expected value or is otherwise correct in operation 536. The handshake is then completed in operation 538. Completion of the handshake may additionally be used to trigger different actions in device 504 and associated host device phone 502. In some embodiments, for example, images captured on device 504 are limited to being communicated to phone 502. Attempts to perform a new handshake with a different phone will trigger deletion of images stored in a shared memory of device 504 that were captured while device 504 was paired with phone 502. Similarly, in some embodiments, transmission of images or video clips from device 504 may be limited to phone 502, and further encrypted such that an application on device 504 and phone 502 use the secure information to limit viewing of content to phone 502 for images captured by device 504 while paired with phone 502. Phone 502 may "unlock" such images and allow them to be communicated as ephemeral messages with an associated deletion trigger via a network such as social messaging system 130. In some embodiments, the DHKey or other information from the handshaking process is needed to decrypt or otherwise unlock the images for distribution.

In some embodiments, the pairing involves a comparison handshake compliant with H7.3 of the Bluetooth LE™ core specification.

Once this initial pairing has been performed, both devices may store pairing information to enable the secure connection to be reestablished without initiating another optical code pairing. In some embodiments, such information is stored at the wearable device for only a single host device at a time, such that pairing with a different host device requires optical code pairing to reestablish the connection with the first host device.

Figure 6:
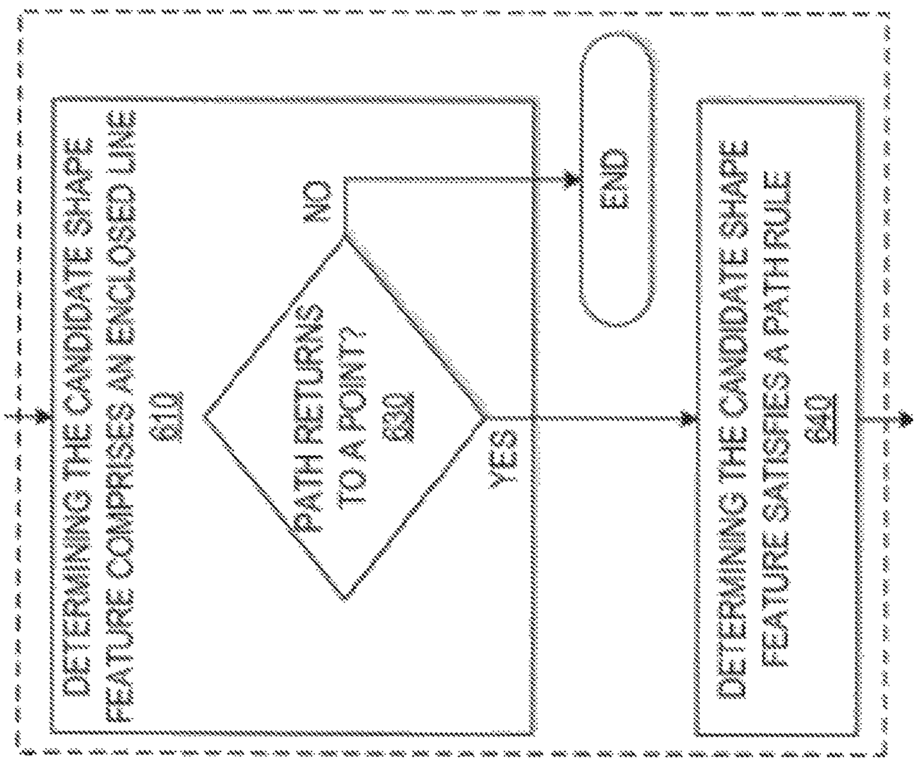

FIG. 6 is a flow diagram illustrating further example operations for identifying the optical barcode using the custom functional pattern. Such operations may be used by a wearable device such as device 504 when detecting optical codes in operations 512 and 520. In FIG. 6, the finder module 230 determines that the candidate shape feature satisfies the shape feature rule.

At operation 610, the finder module 230 determines that the candidate shape feature comprises an enclosed line from the image data. That is to say, the shape feature rule comprises a path rule and the finder module 230 determines that the candidate shape feature satisfies the path rule. The finder module 230 can employ a variety to techniques to determine that the candidate shape feature satisfies the path rule.

At operation 630, the finder module 230 determines whether the candidate shape feature is an enclosed line by determining that the candidate shape feature encircles a portion of the image by having a path that starts at a particular point and returns to the same particular point. In an example embodiment, if the candidate shape feature does not satisfy the path rule (indicated by "no" in FIG. 6), no further analysis of the candidate shape feature is performed and the finder module 230 analyzes another candidate shape feature or performs no further operations. Alternatively, at operation 640, if the finder module 230 determines that the candidate shape feature satisfies the path rule (indicated by "yes" in FIG. 6), the subsequent operations proceed with detecting the optical code.

Figure 7:
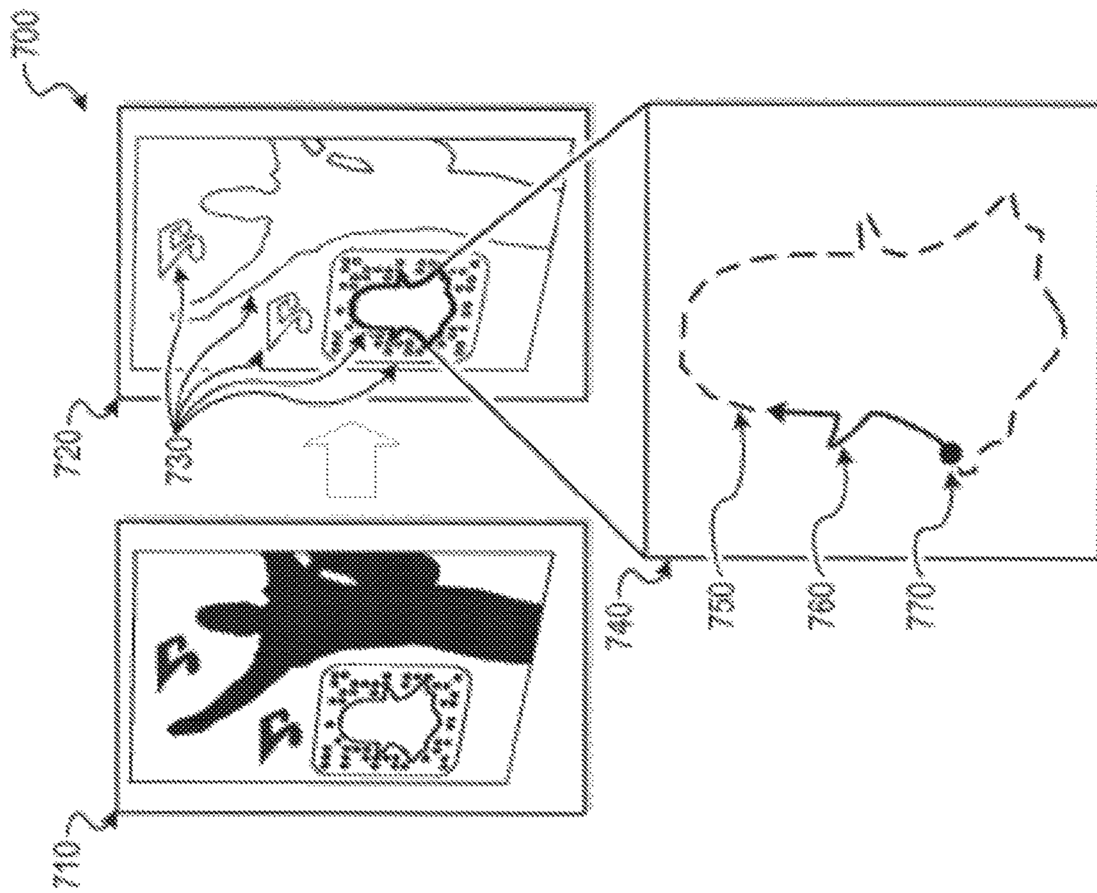
FIGS. 6 and 7 illustrate aspects of optical code recognition, in accordance with some embodiments.

To illustrate the concepts of FIG. 6, FIG. 7 is a diagram 700 illustrating an example of identifying the optical barcode using the custom functional pattern. In the diagram 700, the image 710 is an example image that is received or accessed from the user device. The image 720 is an example image portraying example candidate shape features 730. For instance, the finder module 230 performs an edge detection image processing on the image 710 to derive the image 720. From the image 720, the finder module 230 identifies the candidate shape features 730.

Callout 740 shows a particular candidate shape feature of the candidate shape features 730. The callout 740 shows a contour line 750 (illustrated as a dotted line) of the particular candidate shape feature, a path 760, and a point 770 of the particular candidate shape feature. In the callout 740, the finder module 230 determines that the path rule is met if the path 760 that starts at the point 770 can follow the contour line 750 and return to the point 770. In the diagram 700, the particular candidate shape feature shown in the callout 740 does satisfy the path rule since the path 760 can follow the contour line 750 and return to the point 770.

Figure 8:
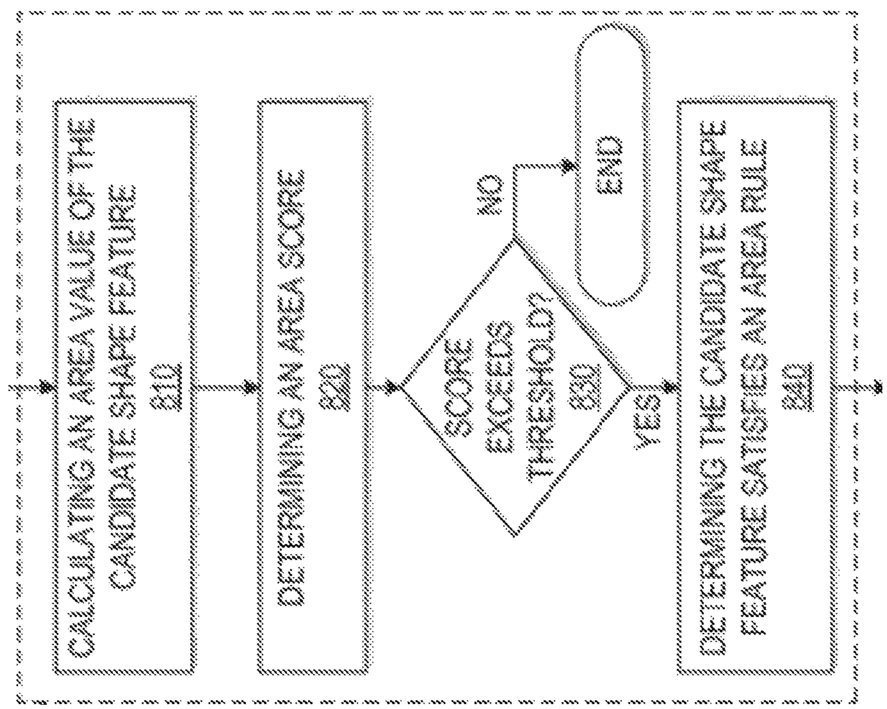

FIG. 8 is a flow diagram illustrating further example operations for identifying the optical barcode using the custom functional pattern. In FIG. 8, the finder module 230 determines that the candidate shape feature satisfies the shape feature rule. At operation 810, the finder module 230 calculates an area value or size approximation of the candidate shape feature. For example, the finder module 230 uses a proxy shape such as a polygon (e.g., a square, a rectangle, or a quadrilateral) or a non-polygonal shape (e.g., an ellipse) to approximate the shape of the candidate shape feature. The finder module 230 fits or nearly fits the proxy shape to the outer edges or outer perimeter of the candidate shape feature so that the proxy shape is representative of an area of the candidate shape feature. Subsequently, the finder module 230 calculates the area value of the proxy shape to determine the area value or size approximation of the candidate shape feature. In some embodiments, the finder module 230 employs such a technique (e.g., polygonal area approximation) to avoid a computationally expensive area calculation of the candidate shape feature in situations where the candidate shape feature is likely to be complex in shape (e.g., an area calculation for a non-uniform or irregular shaped feature is typically more computationally expensive). In some embodiments, other techniques such as pixel based counting can be employed to determine the area value.

At operation 820, the finder module 230 determines an area score or size score of the candidate shape feature. The finder module 230 determines the area score by comparing the area value of the candidate shape feature with a reference area value. In some embodiments, the reference area value comprises an area value of a corresponding proxy shape fitted to a reference image of the custom graphic (e.g., the area value of a proxy shape fitted to the ghost logo from a front view perspective). In other embodiments, the reference area value comprises the area value of the custom graphic (e.g., the area value of the ghost logo). The finder module 230 calculates the area score, for example, by determining a match percentage between the candidate shape feature area value and the reference area value. The finder module 230 can employ a wide variety of other schemes and techniques to calculate the area score.

At operation 830, the finder module 230 determines whether the area score exceeds a threshold. The threshold can be predefined or dynamically determined (e.g., statistically determined based on a rolling historical average of scans).

At operation 840, based on the area score exceeding the threshold (indicated by "yes" in FIG. 8), the finder module 230 determines that the candidate shape feature satisfies the area rule and proceeds to subsequent operations. In another example embodiment, the finder module 230 compares the area score to an area range to satisfy the area rule (e.g., greater than a particular value and less than a particular value). If the area score does not exceed the threshold (indicated by "no" in FIG. 8) in operation 830, the finder module 230 analyzes another candidate shape feature or no further operations are performed, according to an example embodiment. In some example embodiments, the finder module 230 uses the determination of whether the candidate shape feature satisfies the shape feature rules as a filter (e.g., to remove or skip candidate shape features that are unlikely to be the custom graphic) to identify candidate shape features to be further analyzed in the process of identifying the custom graphic in the image.

Figure 9:
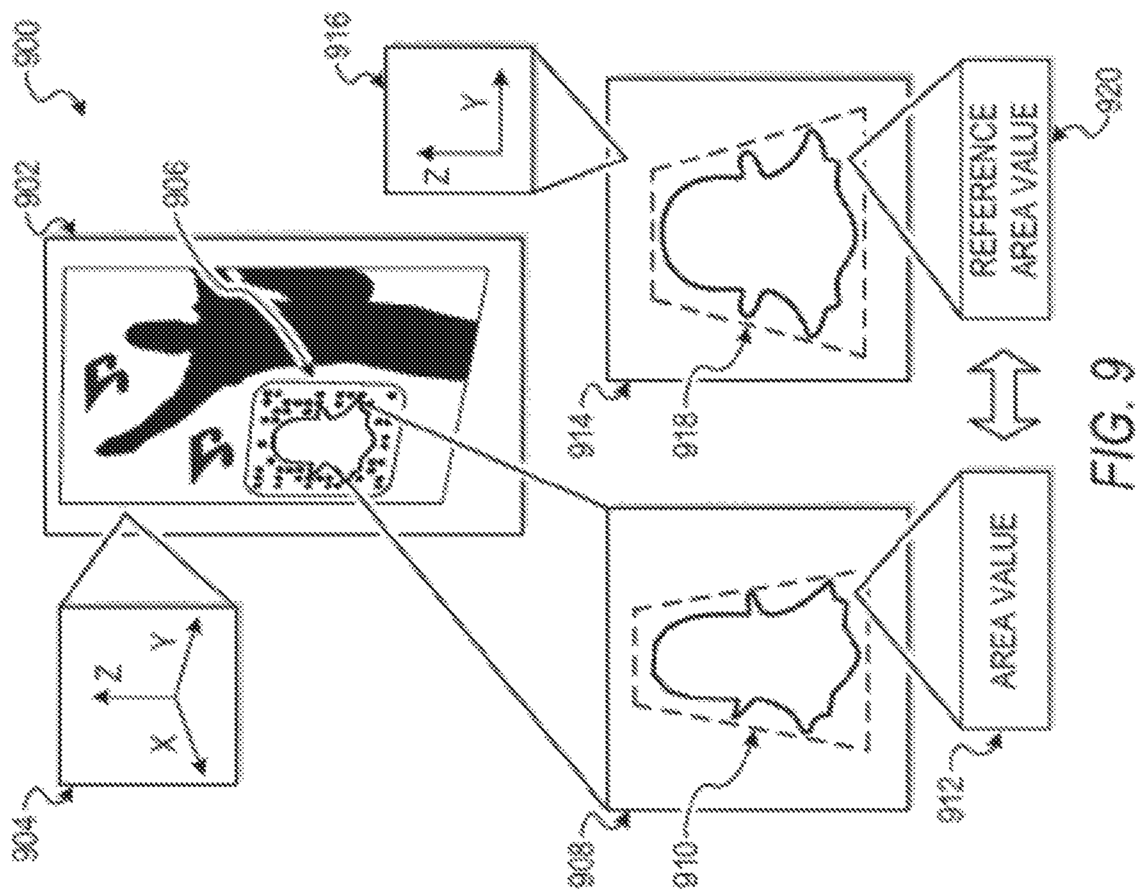
FIGS. 8 and 9 illustrate aspects of optical code recognition, in accordance with some embodiments.

To further illustrate the concepts of FIG. 8, FIG. 9 is a diagram 900 illustrating an example of identifying the optical barcode using the custom functional pattern. In the diagram 900, image 902 is an example image that is received from the user device. Callout 904 shows the spatial orientation of the image 902. In this example, the image 902 is portrayed and being seen from a front right perspective. The image 902 includes optical barcode 906. In this example, the optical barcode 906 employs the custom graphic as a functional pattern.

Callout 908 shows an enlarged portion of the image 902 that includes the candidate shape feature being analyzed by the finder module 230 to identify the custom graphic. In the callout 908, the polygon 910 (e.g., a quadrilateral) is shown fitted to a perimeter of the candidate shape feature. Area value 912 is the area of the polygon 910.

Callout 914 shows a reference image of the custom graphic. Callout 916 shows the spatial orientation of the reference image. In this example, the reference image is shown from the front view perspective. Polygon 918 is shown fitted to a perimeter of the reference image. Reference area value 920 is the area of the polygon 918. Although FIG. 9 shows polygons 910 and 918 as quadrilaterals, the finder module 230 can employ other shapes such as a square or a shape that follows or traces a contour of the candidate shape feature (e.g., an n-sided polygon or smooth fitted shape that follows contour points of the candidate shape feature).

The finder module 230 compares the area value 912 with the reference area value 920 to determine that the candidate shape feature satisfies the area rule. Another candidate shape feature of the image 902, such as one of the musical notes of the image 902, would not have an area value that is similar to the reference area value and therefore would not satisfy the area rule. In this way, the finder module 230 can quickly remove or skip certain candidate shape features that are unlikely to be identified as the custom graphic.

Figure 10:
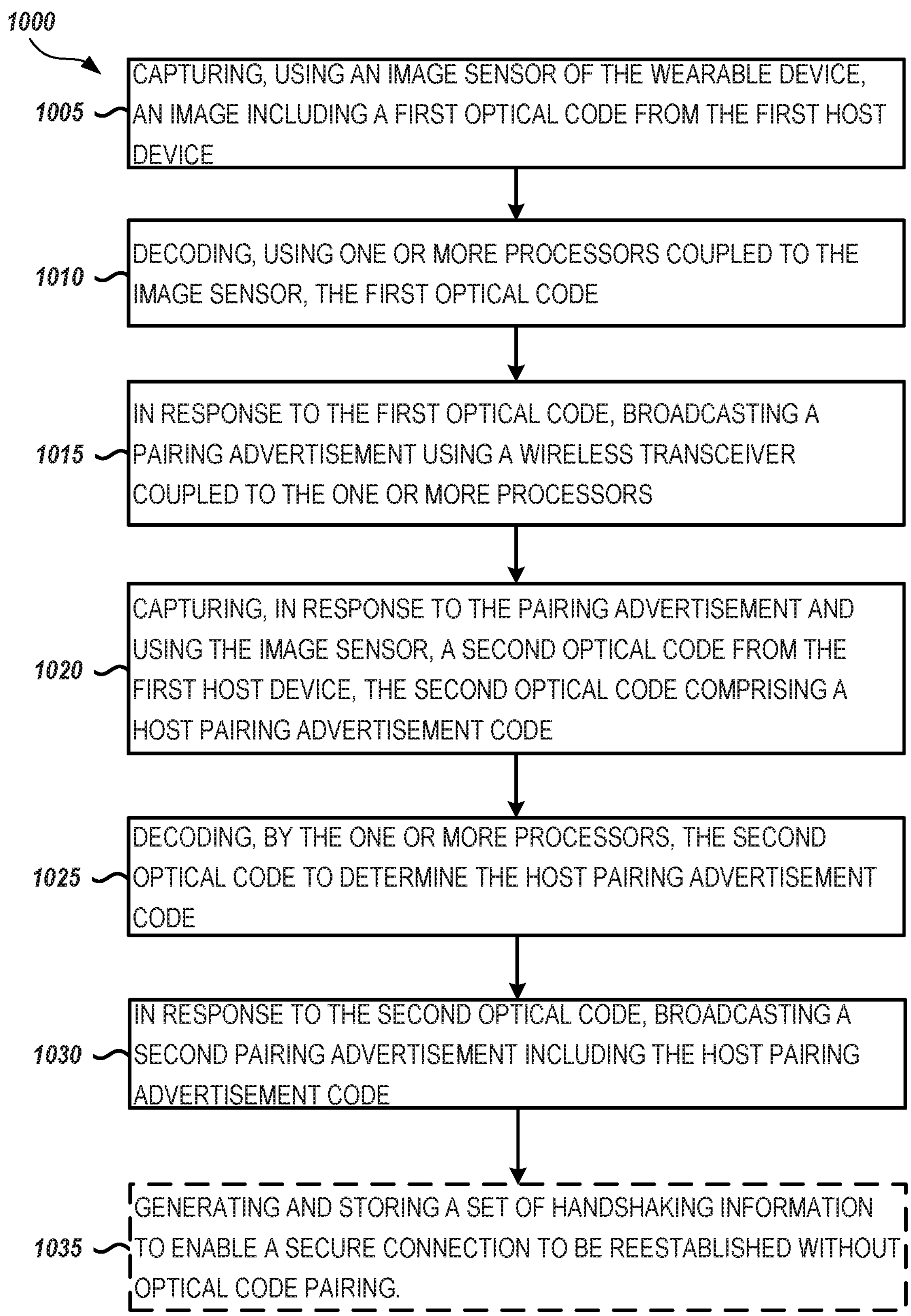
FIG. 10 illustrates a process flow for device pairing with optical codes, in accordance with some embodiments.

FIG. 10 then illustrates a method 1000 for device pairing with optical codes. In one embodiment, method 1000 is performed by a wearable device such as glasses 31 of FIG. 13. In other embodiments, other such wearable devices may be used. In some embodiments, method 1000 is performed by elements of a wearable device, including processors, image sensors, and communication circuitry of a wearable device. In some embodiments, method 1000 is instantiated as instructions stored in a non-transitory storage medium that may be executed by one or more processors to cause a device to perform the operations of method 1000.

Method 100 begins with operation 1005 where a wearable device captures an image including a first optical code from the first host device. In some embodiments, this capturing may involve multiple frames of a video clip. In other embodiments, this capturing may involve a single image captured as a picture. In some embodiments, this data is stored in a shared memory of the wearable device, along with other pieces of content captured and stored for future communication as ephemeral messages via a communication network. In other embodiments, the shared memory may be full, and the image is stored in a volatile or reserve memory while being processed. The image is then deleted after the data is extracted to free the reserve memory for additional images that may be processed while the shared memory is full.

The first optical code is then decoded, using one or more processors coupled to the image sensor of wearable device, in operation 1010. This decoding may involve various transformations or calculations to recognize an optical code, including identifying custom patterns for an optical code as described herein. Then in operation 1015, in response to the first optical code, the wearable device begins broadcasting a pairing advertisement using a wireless transceiver coupled to the one or more processors. As described herein, this broadcast may use Bluetooth LE™ or may use any other wireless communication standards, such as an Institute of Electrical and Electronic Engineering (IEEE) 802.11 standard communication.

Following this, in operation 1020, the wireless device proceeds with capturing, in response to the pairing advertisement and using the image sensor, a second optical code from the first host device, with the second optical code comprising a host pairing advertisement code. In operation 1025, the wireless device gets the advertisement code by decoding the second optical code to determine the host pairing advertisement code. Then, in response to the second optical code, in operation 1030, the wireless device begins broadcasting a second pairing advertisement including the host pairing advertisement code.

In various embodiments, the host pairing advertisement code is used to establish communications between the wearable device and the host device in a variety of different ways. In some embodiments, this information is used in establishing secure communications, and then generating and storing a set of handshaking information that allows a secure connection to be reestablished without the use of optical codes, in operation 1035. As described above, in some embodiments, this involves the use of DHKeys. In other embodiments, other secure communications may be used. For example, in some embodiments, the DHKeys may be stored as part of the set of handshaking information. In some embodiments, wireless communication identifiers and one or more secure access codes to enable reestablishment of the secure connection are stored as the handshaking information, such that inputs on the user interface of the wearable device or the host device may be used to initiate reestablishing of the secure connection between the host device and the wearable device. In some embodiments, only a single set of handshaking information may be associated with a wearable device at any given time, such that the wearable device will only respond to the most recent set of handshaking information, and any previous handshaking information associated with a wearable device will be ignored (e.g. deleted from memory.) In other embodiments, multiple sets of handshaking information may be associated with either a host device or a wearable device, and upon a user interface input to reestablish a connection, the user may select a particular pairing, or the device may cycle through all sets of stored handshaking information in an attempt to reestablish a connection with any nearby device that has previously been paired.

In some embodiments, the pairing advertisement comprises a generic advertising signal broadcast such that a plurality of local host devices receive and decode the pairing advertisement, with each local host device of the plurality of local host devices displaying a resulting host pairing advertisement code. As described above, this allows any local host that is listening to detect the initial pairing advertisement.

In some embodiments, additional operations are performed including, in response to the second pairing advertisement, establishing a communication channel between the first host device and the wearable device; communicating, via the communication channel, a first key from the wearable device to the first host device; receiving, via the communication channel, a second key at the wearable device from the host device; and establishing an encrypted connection using the first key and the second key.

This may operate in some embodiments such that the encrypted connection is established using an application-level elliptic curve ECDH exchange with the first key and the second key to establish a shared secret, and where the communication channel is established using a Bluetooth Low Energy connection between the first host device and the wearable device.

Further such embodiments may operate by receiving, at the wearable device via the encrypted connection, a first HMAC based on the shared secret, wherein the shared secret comprises a DHKey; verifying, using the one or more processors of the wearable device, the first HMAC; generating, using the one or more processors of the wearable device in response to verification of the first HMAC, a second HMAC based on the DHKey; and transmitting the second HMAC from the wearable device to the first host device.

As part of decoding the first optical code, various embodiments may perform operations such as receiving image data of an image from a user device; extracting a candidate shape feature of the image from the image data; determining that the candidate shape feature satisfies a shape feature criterion; in response to the candidate shape feature satisfying the shape feature criterion, identifying a custom symbol in the image by comparing the candidate shape feature with a reference shape feature of the custom symbol; in response to identifying the custom symbol, extracting, using a hardware processor of a machine, a geometry attribute of the custom symbol in the image from the image data; and decoding data encoded in a portion of the image from the image data using the geometry attribute of the custom symbol in the image.

Some such operations for processing an optical code may additionally include: calculating a size approximation of the candidate shape feature from the image data; determining a size score for the candidate shape feature by comparing the size approximation with a reference size of the custom symbol; determining that the candidate shape feature satisfies a size criterion based on the size score exceeding a threshold, wherein the shape feature criterion comprises the size criterion; determining from the image data that the candidate shape feature comprises an enclosed line, wherein the enclosed line encircles a portion of the image by having a path that starts at a particular point and returns to the particular point; or determining that the candidate shape feature satisfies a path criterion based on the candidate shape feature comprising the enclosed line, wherein the shape feature criterion comprises the path criterion.

Similarly, some embodiments may detect optical codes where a geometry attribute comprises at least one of a position, scale, or orientation of the custom symbol in the image. Additional optical code detection operations may include extracting a distinctive feature of the custom symbol from the image data, the distinctive feature being indicative of an identification of the custom symbol; determining an orientation of the custom symbol in the image by comparing the distinctive feature with a reference distinctive feature of the custom symbol; and decoding the data encoded in the image using the orientation and a position of the custom symbol in the image.

In some embodiments, images captured on the wearable device are encrypted using the secure data or handshaking information. This may function to "lock" the images and video content to the paired host device, such that the paired device needs to view the content captured by the wearable device. In some embodiments, a wearable device may store content associated with a first host while paired to a second host. In some such embodiments, the handshaking information prevents the data from being transferred to the second host device. In other embodiments, the data may be transferred, but is not viewable at the second host device. In still further embodiments, the content associated with the first host device is automatically deleted when a pairing to a second host device occurs.

Figure 11:
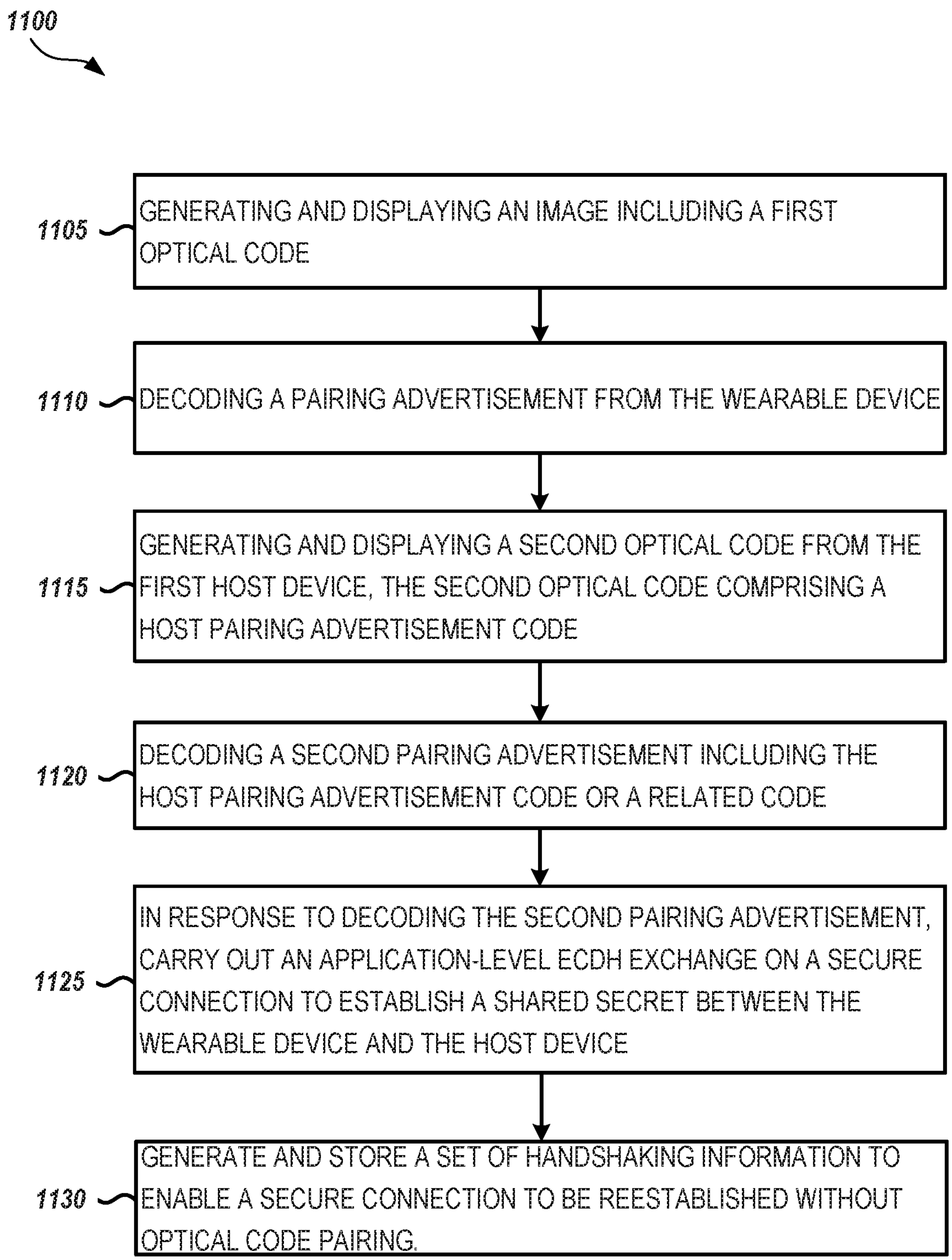
FIG. 11 illustrates a process flow for device pairing with optical codes, in accordance with some embodiments.

FIG. 11 then illustrates a method 1100 for device pairing with optical codes. In one embodiment, method 1100 is performed by a host device such as phone 502 of FIG. 5 or device 1200 of FIGS. 12A-B. In other embodiments, other such host devices may be used. In some embodiments, method 1100 is instantiated as instructions stored in a non-transitory storage medium, that may be executed by one or more processors to cause a device to perform the operations of method 1100. In some embodiments, method 1100 comprises operations performed by a host device in conjunction with corresponding operations of method 1000 being performed by a wearable device, with the host and wearable devices communicating with each other as part of the operations. Method 1100 begins with operation 1105 where the host device generates and displays an image including a first optical code. In some embodiments, this may be in response to a user interface election, in some embodiments, an initial screen of an application operating on a host device involve presentation of an optical code on a screen of the host device. In still further embodiments, various sensors may initiate display of an optical code in an image. For example, a clock or alarm may periodically initiate such a display, or sensors detecting proximity to or a signal from a wearable device may initiate an initial optical code.

During display of the optical code in operation 1105, the host device listens for a pairing advertisement, and in operation 1110, the host device receives and decodes a pairing advertisement from a wearable device. This pairing advertisement may be generic, without any detail associated with the host device.

In operation 1115, the host device generates and displays a second optical code from the first host device, with the second optical code comprising a host pairing advertisement code. This host pairing advertisement code includes information specific to the host generating and displaying the code (e.g., in contrast to the generic pairing advertisement.)

Again, while displaying the second optical code, the host device listens for a pairing advertisement. In operation 1120, the host device receives a second pairing advertisement. The second pairing advertisement is not generic and includes the host pairing advertisement code or a related code derived from the host pairing advertisement code. In operation 1120, the host device decodes a second pairing advertisement including the host pairing advertisement code and uses this information to verify that the correct wearable device is identified for pairing.

In operation 1125, in response to decoding the second pairing advertisement, the host device carries out an application-level ECDH exchange to establish a shared secret and establish a secure connection between the wearable device and the host device. In operation 1130, this connection is used to generate and store a set of handshaking information to enable a secure connection to be reestablished without optical code pairing.

As described above, this information may be used to lock content captured by a wearable device to the host device that is paired with the wearable device when the content is captured. The host device may use an application to "unlock" such images and allow them to be communicated as ephemeral messages with an associated deletion trigger via a network such as social messaging system 130. In some embodiments, the DHKey or other information from the handshaking process is needed to decrypt or otherwise unlock the images for distribution.

Additionally, in some embodiments, the host device executes the above operations as part of a shared application environment with the wearable device. In such embodiments, the wearable device and the host device each execute separate portions of the shared application environment, with the host device executing a host portion and the wearable device executing the wearable device portion. The host portion may be an application executed in response to a user interface input received from a host device user. The wearable device portion may be an integral part of the wearable device that always operates. When the host application displays the optical code, the wearable device application executes operations to recognize optical codes in a pattern that is expected within the context of the shared application environment. This may include the use of custom images or code patterns, and associated rules for recognizing the code patterns at the wearable device in a way that is configured to limited processor usage at the wearable device, given the lower battery and processing resource of the wearable device compared with the host device.

Additionally, as described above, the host application may operate to initiate a particular wireless listening protocol while optical codes are displayed. In such embodiments, the application configures the processors to initiate a wireless listening protocol only while the optical code is displayed, or for a limited time period associated with display of the optical code. Each new presentation of an optical code may be associated with a corresponding limited wireless listening period. If the host device does not receive the appropriate pairing advertisement during the listening period, the pairing process terminates. Thus, while a device displaying a first optical code may respond to an initial generic pairing advertisement, display a second optical code in response to the initial generic pairing advertisement, and receive a second pairing advertisement, no connection will be made if the second pairing advertisement does not include the correct code, and the host device will stop listening after the associated listening period. In some embodiments, the listening period is limited to a set amount of time (e.g. 10 seconds, 15 seconds, etc.) after the display of an optical code is initiated to conserve power and prevent unwanted communications. In other embodiments, the listening period matches the display of the optical code (e.g. will end when a sleep trigger or other trigger causes the optical code to no longer be displayed.) In other embodiments, any such time period for wireless listening associated with display of an optical code may be used. Similarly, for a single host, different listening periods may be used for the initial optical code while listening for a generic pairing advertisement, and the second optical code while listening for a pairing advertisement with a host pairing code.

While particular operations are described above, it will be apparent that operations may be repeated, or intervening operations may be present, such that variations on the above methods are possible within the scope of the described embodiments for device pairing with optical codes.

Figure 12A:
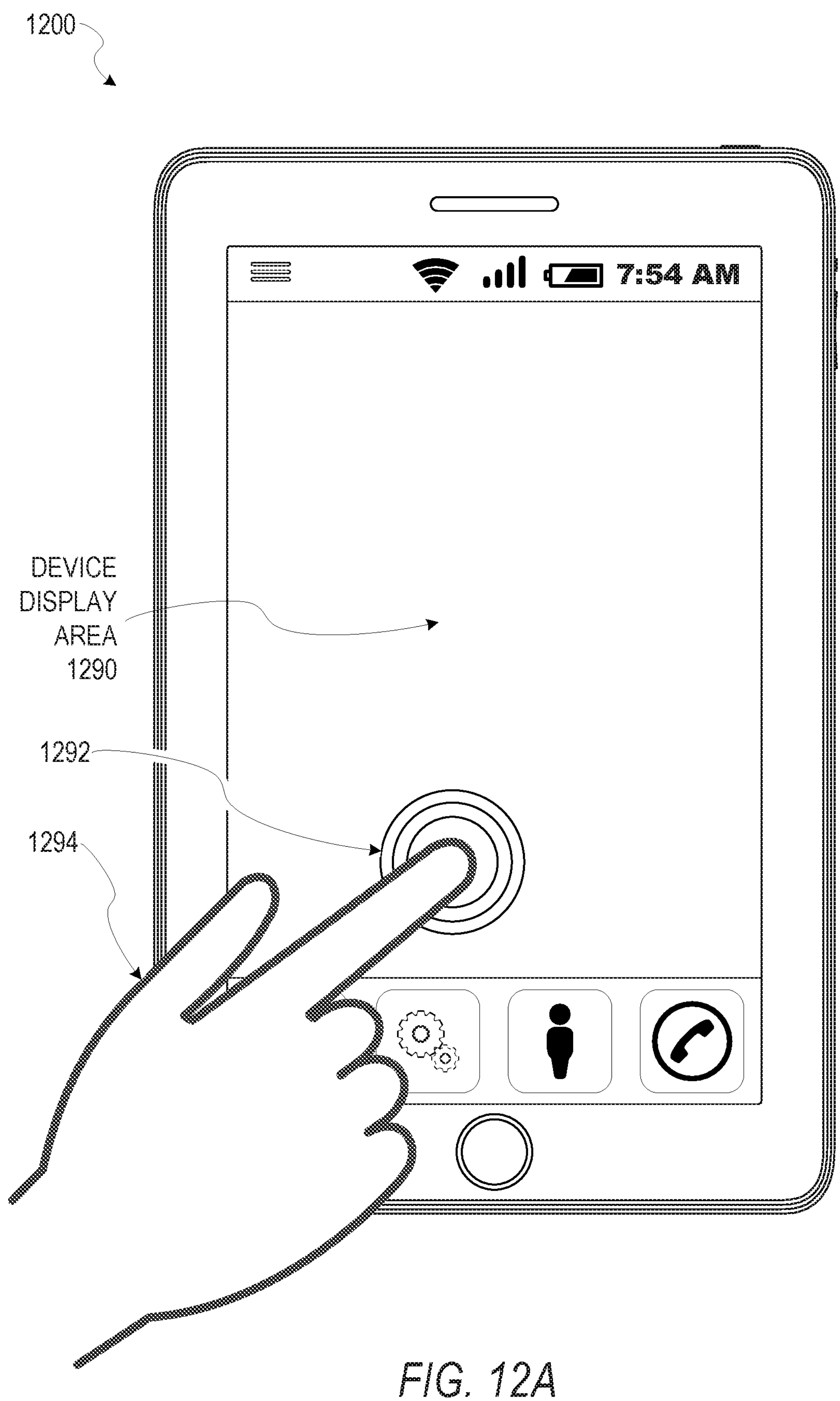
FIGS. 12A-12B show aspects of a host device that may use optical code pairing, in accordance with some embodiments described herein.

FIG. 12A illustrates an example mobile device 1200 that may be used as a host device for pairing with a wearable device using optical codes as described herein. Inputs and adjustments to any system operation described herein may be performed using touch screen inputs 1292 within device display area 1290 by a user 1294. Additionally, selection of user interface inputs to display an initial optical code and a subsequent pairing code may use touch screen input 1292. Additional inputs may initiate transmission of advertising communication and initiate scanning for communications from a device to be paired.

Figure 12B:
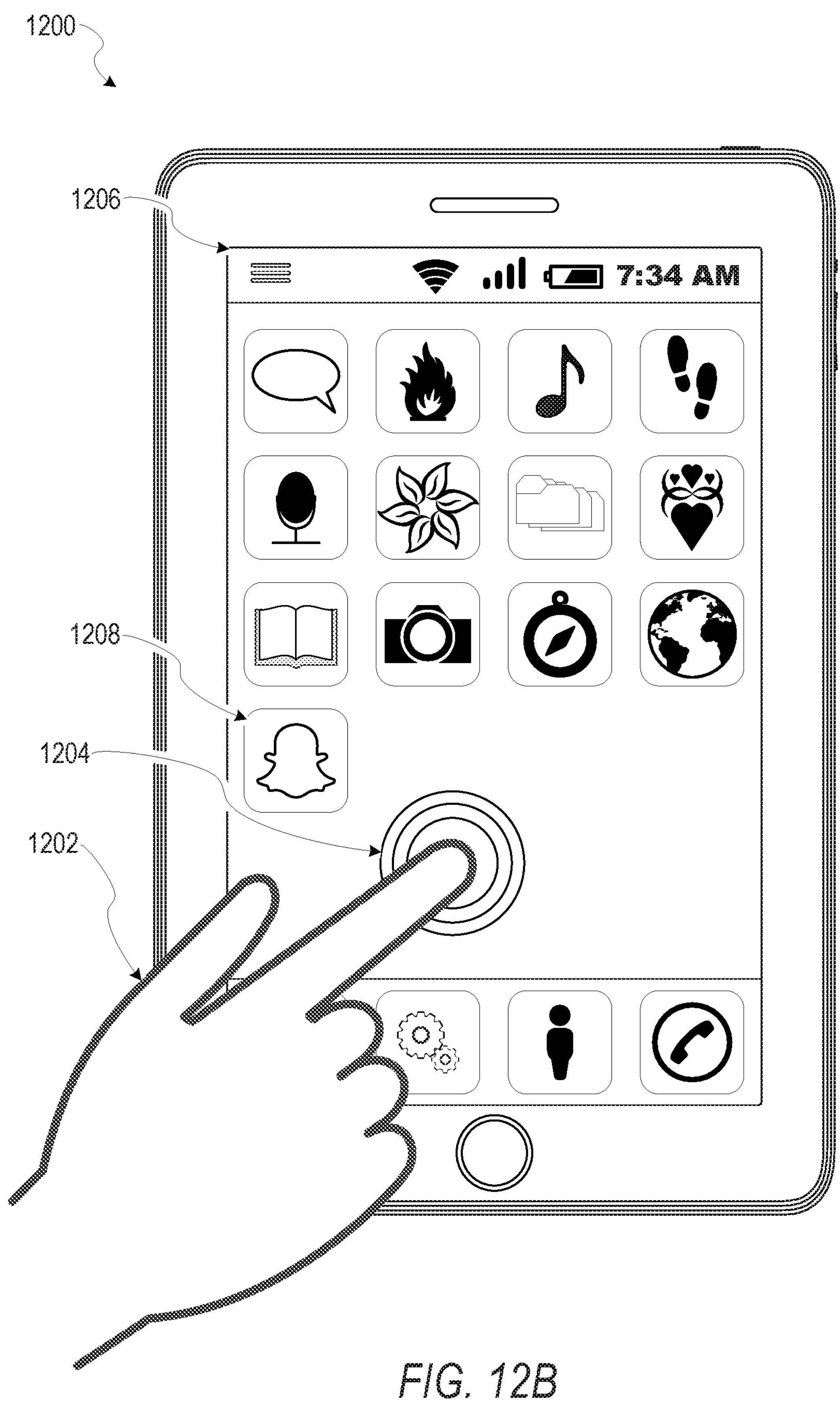

FIG. 12B illustrates an example mobile device 1200 executing a mobile operating system (e.g., IOS™, ANDROID™, WINDOWS® Phone, or other mobile operating systems), consistent with some embodiments. In one embodiment, the mobile device 1200 includes a touch screen operable to receive tactile data from a user 1202. For instance, the user 1202 may physically touch 1204 the mobile device 1200, and in response to the touch 1204, the mobile device 1200 may determine tactile data such as touch location, touch force, or gesture motion. In various example embodiments, the mobile device 1200 displays a home screen 1206 (e.g., Springboard on IOS™) operable to launch applications or otherwise manage various aspects of the mobile device 1200. In some example embodiments, the home screen 1206 provides status information such as battery life, connectivity, or other hardware statuses. The user 1202 can activate user interface elements by touching an area occupied by a respective user interface element. In this manner, the user 1202 interacts with the applications of the mobile device 1200. For example, touching the area occupied by a particular icon included in the home screen 1206 causes launching of an application corresponding to the particular icon.

Many varieties of applications (also referred to as "apps") can be executed on the mobile device 1200, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1200 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1200 includes a social messaging app 1208 such as SNAPCHAT® that, consistent with some embodiments, allows users to exchange ephemeral messages that include media content. In this example, the social messaging app 1208 can incorporate aspects of embodiments described herein.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, “processor-implemented module” refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a “cloud computing” environment or as a “software as a service” (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with the figures above are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the “internet of things,” while yet another combination produces a server computer for use within a cloud computing architecture. Not all combinations of such software and hardware architectures are presented here as those of skill in the art can readily understand how to implement the various embodiments in different contexts from the disclosure contained herein.

Figure 13:
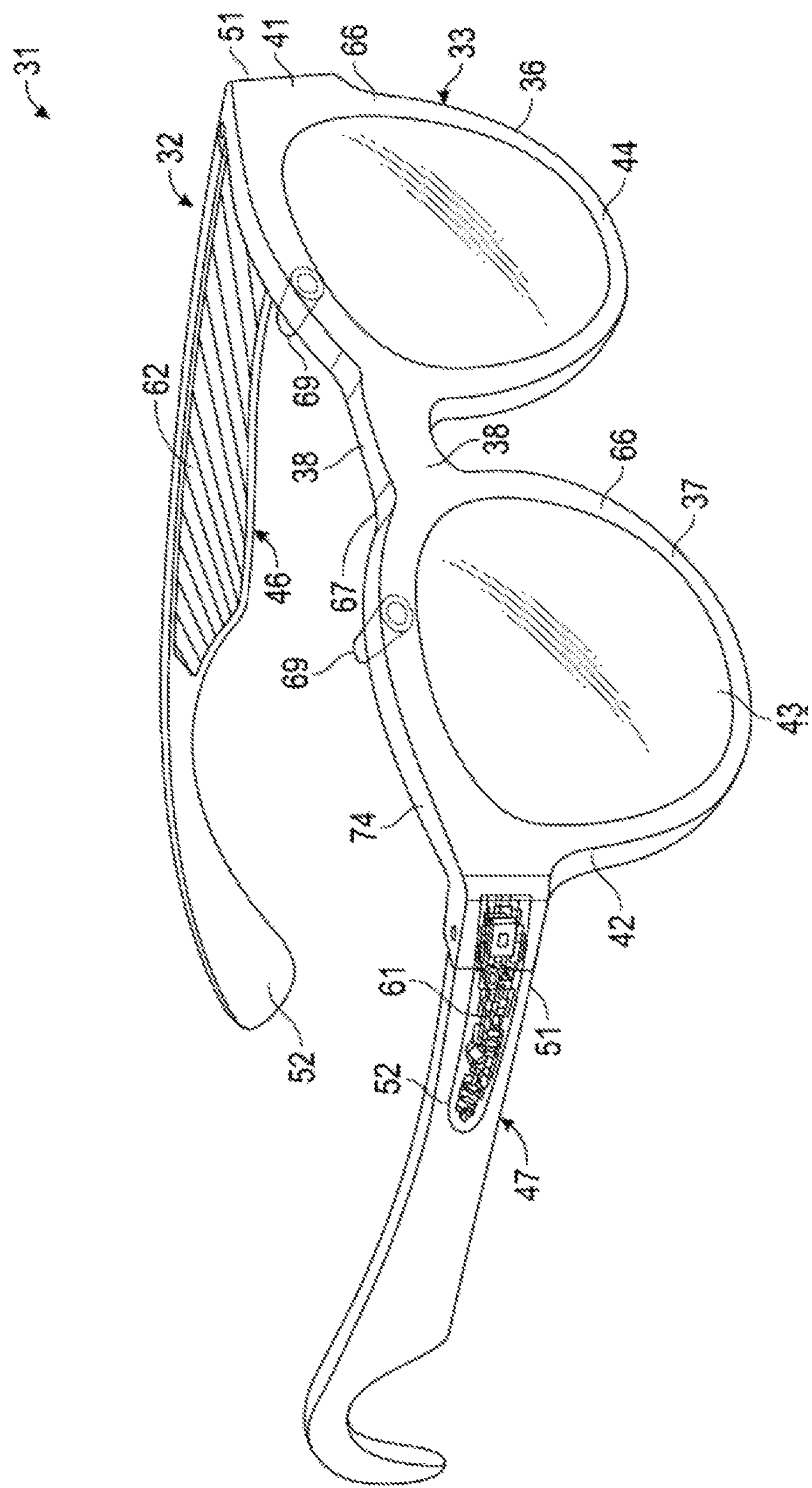
FIG. 13 shows aspects of a wearable device that may use optical code pairing, in accordance with some embodiments described herein.

FIG. 13 shows aspects of certain embodiments illustrated by a front perspective view of glasses 31. Glasses 31 may, in some embodiments, be a client companion device 114 or wearable device that is used to capture images including optical codes and pairing codes as part of operations to create secure communications between the glasses 31 and a host device. The glasses 31 can include a frame 32 made from any suitable material such as plastic or metal, including any suitable shape memory alloy. The frame 32 can have a front piece 33 that can include a first or left lens, display, or optical element holder 36; and a second or right lens, display, or optical element holder 37 connected by a bridge 38. The front piece 33 additionally includes a left end portion 41 and a right end portion 42. A first or left optical element 44 and a second or right optical element 43 can be provided within respective left and right optical element holders 36, 37. Each of the optical elements 43, 44 can be a lens, a display, a display assembly, or a combination of the foregoing. Any of the display assemblies disclosed herein can be provided in the glasses 31.

Frame 32 additionally includes a left arm or temple piece 46 and a second arm or temple piece 47 coupled to the respective left and right end portions 41, 42 of the front piece 33 by any suitable means such as a hinge (not shown), so as to be coupled to the front piece 33, or rigidly or fixably secured to the front piece so as to be integral with the front piece 33. Each of the temple pieces 46 and 47 can include a first portion 51 that is coupled to the respective end portion 41 or 42 of the front piece 33 and any suitable second portion 52, such as a curved or arcuate piece, for coupling to the ear of the user. In one embodiment, the front piece 33 can be formed from a single piece of material, so as to have a unitary or integral construction.

Glasses 31 can include a computing device, such as computer 61, which can be of any suitable type so as to be carried by the frame 32 and, in one embodiment, of a suitable size and shape so as to be at least partially disposed in one of the temple pieces 46 and 47. In one embodiment, as illustrated in FIG. 13, the computer 61 is sized and shaped similar to the size and shape of one of the temple pieces 46 and 47 and is thus disposed almost entirely if not entirely within the structure and confines of such temple pieces 46 and 47. In one embodiment, the computer 61 can be disposed in both of the temple pieces 46, 47. The computer 61 can include one or more processors with memory, wireless communication circuitry, and a power source. In certain embodiments, the computer 61 comprises low-power circuitry, high-speed circuitry, and a display processor. Various other embodiments may include these elements in different configurations or integrated together in different ways.

The computer 61 additionally includes a battery 62 or other suitable portable power supply. In one embodiment, the battery 62 is disposed in one of the temple pieces 46 or 47. In the glasses 31 shown in FIG. 13, the battery 62 is shown as being disposed in left temple piece 46 and electrically coupled using connection 74 to the remainder of the computer 61 disposed in the right temple piece 47. The one or more input and output devices can include a connector or port (not shown) suitable for charging a battery 62 accessible from the outside of frame 32, a wireless receiver, transmitter or transceiver (not shown), or a combination of such devices.

Glasses 31 include cameras 69. Although two cameras are depicted, other embodiments contemplate the use of a single or additional (i.e., more than two) cameras. In various embodiments, glasses 31 may include any number of input sensors or peripheral devices in addition to cameras 69. Front piece 33 is provided with an outward facing, forward-facing, or front or outer surface 66 that faces forward or away from the user when the glasses 31 are mounted on the face of the user, and an opposite inward-facing, rearward-facing, or rear or inner surface 67 that faces the face of the user when the glasses 31 are mounted on the face of the user. Such sensors can include inwardly-facing video sensors or digital imaging modules such as cameras that can be mounted on or provided within the inner surface 67 of the front piece 33 or elsewhere on the frame 32 so as to be facing the user, and outwardly-facing video sensors or digital imaging modules such as cameras 69 that can be mounted on or provided with the outer surface 66 of the front piece 33 or elsewhere on the frame 32 so as to be facing away from the user. Such sensors, peripheral devices, or peripherals can additionally include biometric sensors, location sensors, or any other such sensors. In additional embodiments, similar elements may be presented as visors, within helmet or google based systems, in vehicle HUD displays, or in any other such device.

Figure 14:
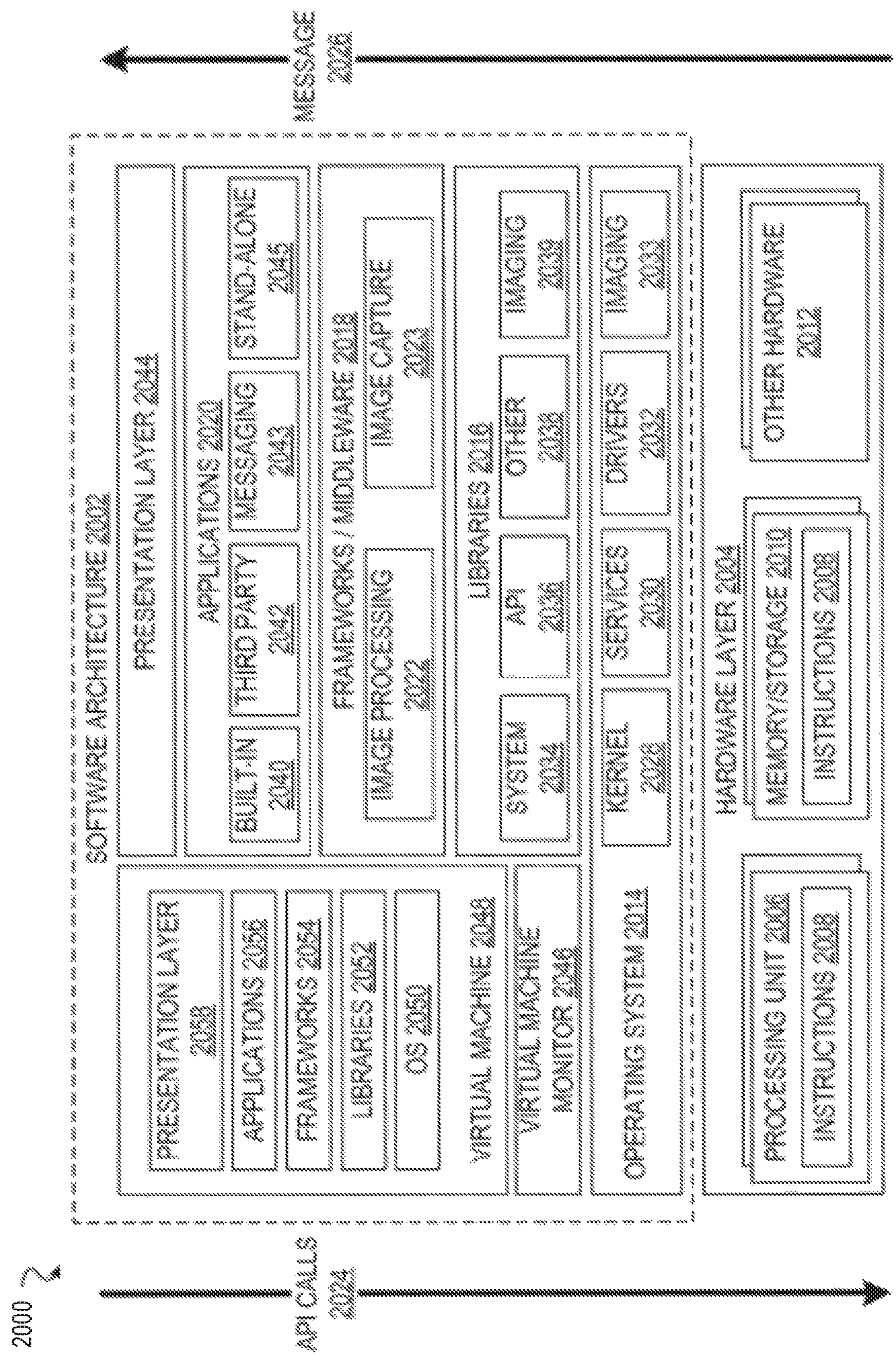
FIG. 14 is a block diagram illustrating a representative software architecture, which may be used in conjunction with various hardware architectures herein described.

FIG. 14 is a block diagram 2000 illustrating a representative software architecture 2002, which may be used in conjunction with various hardware architectures herein described. FIG. 14 is merely a non-limiting example of a software architecture and it will be appreciated that many other architectures may be implemented to facilitate the functionality described herein. The software architecture 2002 may be executing on hardware such as machine 2100 of FIG. 15 that includes, among other things, processors 2110, memory/storage 2130, and input/output (I/O) components 2150. A representative hardware layer 2004 is illustrated and can represent, for example, the machine 2100 of FIG. 15. The representative hardware layer 2004 comprises one or more processing units 2006 having associated executable instructions 2008. Executable instructions 2008 represent the executable instructions of the software architecture 2002, including implementation of the methods, modules and so forth in the figures and description above. Hardware layer 2004 also includes memory and storage modules 2010, which also have executable instructions 2008. Hardware layer 2004 may also comprise other hardware as indicated by 2012 which represents any other hardware of the hardware layer 2004, such as the other hardware illustrated as part of machine 2100.

In the example architecture of FIG. 14, the software 2002 may be conceptualized as a stack of layers where each layer provides particular functionality. For example, the software 2002 may include layers such as an operating system 2014, libraries 2016, frameworks/middleware 2018, applications 2020, and presentation layer 2022. Operationally, the applications 2020 or other components within the layers may invoke API calls 2024 through the software stack and receive a response, returned values, and so forth illustrated as messages 2026 in response to the API calls 2024. The layers illustrated are representative in nature and not all software architectures have all layers. For example, some mobile or special purpose operating systems may not provide the frameworks/middleware layer 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, BLUETOOTH® drivers, flash memory drivers, serial communication drivers (e.g., Universal Serial Bus (USB) drivers), WI-FI® drivers, audio drivers, power management drivers, and so forth depending on the hardware configuration. In an example embodiment, the operating system 2014 includes imaging service 2033 that can provide image processing services, such as hardware accelerated image processing, or image capture services, such as low level access to optical sensors or optical sensor data.

The libraries 2016 may provide a common infrastructure that may be utilized by the applications 2020 or other components or layers. The libraries 2016 typically provide functionality that allows other software modules to perform tasks in an easier fashion than to interface directly with the underlying operating system 2014 functionality (e.g., kernel 2028, services 2030 or drivers 2032). The libraries 2016 may include system 2034 libraries (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media format such as MPREG4, H.264, MP3, AAC, AMR, JPG, or PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules. In an example embodiment, the libraries 2016 include imaging libraries 2039 that provide image processing or image capture functionality that can be utilized by the custom pattern system 160.

The frameworks 2018 (also sometimes referred to as middleware) may provide a higher-level common infrastructure that may be utilized by the applications 2020 or other software components/modules. For example, the frameworks 2018 may provide various graphic user interface (GUI) functions, high-level resource management, high-level location services, and so forth. The frameworks 2018 may provide a broad spectrum of other APIs that may be utilized by the applications 2020 or other software components/modules, some of which may be specific to a particular operating system or platform. In an example embodiment, the frameworks 2018 include an image processing framework 2022 and an image capture framework 2023. The image processing framework 2022 can provide high-level support for image processing functions that can be used in aspects of the custom pattern system 160. Similarly, the image capture framework 2023 can provide high-level support for capture images and interfacing with optical sensors.

The applications 2020 include built-in applications 2040 or third party applications 2042. Examples of representative built-in applications 2040 may include, but are not limited to, a contacts application, a browser application, a book reader application, a location application, a media application, a messaging application, or a game application. Third party applications 2042 may include any of the built-in applications as well as a broad assortment of other applications. In a specific example, the third party application 2042 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or other mobile operating systems. In this example, the third party application 2042 may invoke the API calls 2024 provided by the mobile operating system such as operating system 2014 to facilitate functionality described herein. In an example embodiment, the applications 2020 include a messaging application 2043 that includes the custom pattern system 160 as part of the application. In another embodiment, the applications 2020 include a stand-alone application 2045 that includes the custom pattern system 160.

The applications 2020 may utilize built-in operating system functions (e.g., kernel 2028, services 2030 or drivers 2032), libraries (e.g., system 2034, APIs 2036, and other libraries 2038), frameworks/middleware 2018 to create user interfaces to interact with users of the system. Alternatively, or additionally, in some systems interactions with a user may occur through a presentation layer, such as presentation layer 2044. In these systems, the application/module "logic" can be separated from the aspects of the application/module that interact with a user.

Some software architectures utilize virtual machines. In the example of FIG. 14, this is illustrated by virtual machine 2048. A virtual machine creates a software environment where applications/modules can execute as if they were executing on a hardware machine (such as the machine of FIG. 15, for example). A virtual machine is hosted by a host operating system (operating system 2014 in FIG. 15) and typically, although not always, has a virtual machine monitor 2046, which manages the operation of the virtual machine as well as the interface with the host operating system (i.e., operating system 2014). A software architecture executes within the virtual machine such as an operating system 2050, libraries 2052, frameworks/middleware 2054, applications 2056 or presentation layer 2058. These layers of software architecture executing within the virtual machine 2048 can be the same as corresponding layers previously described or may be different.

Figure 15:
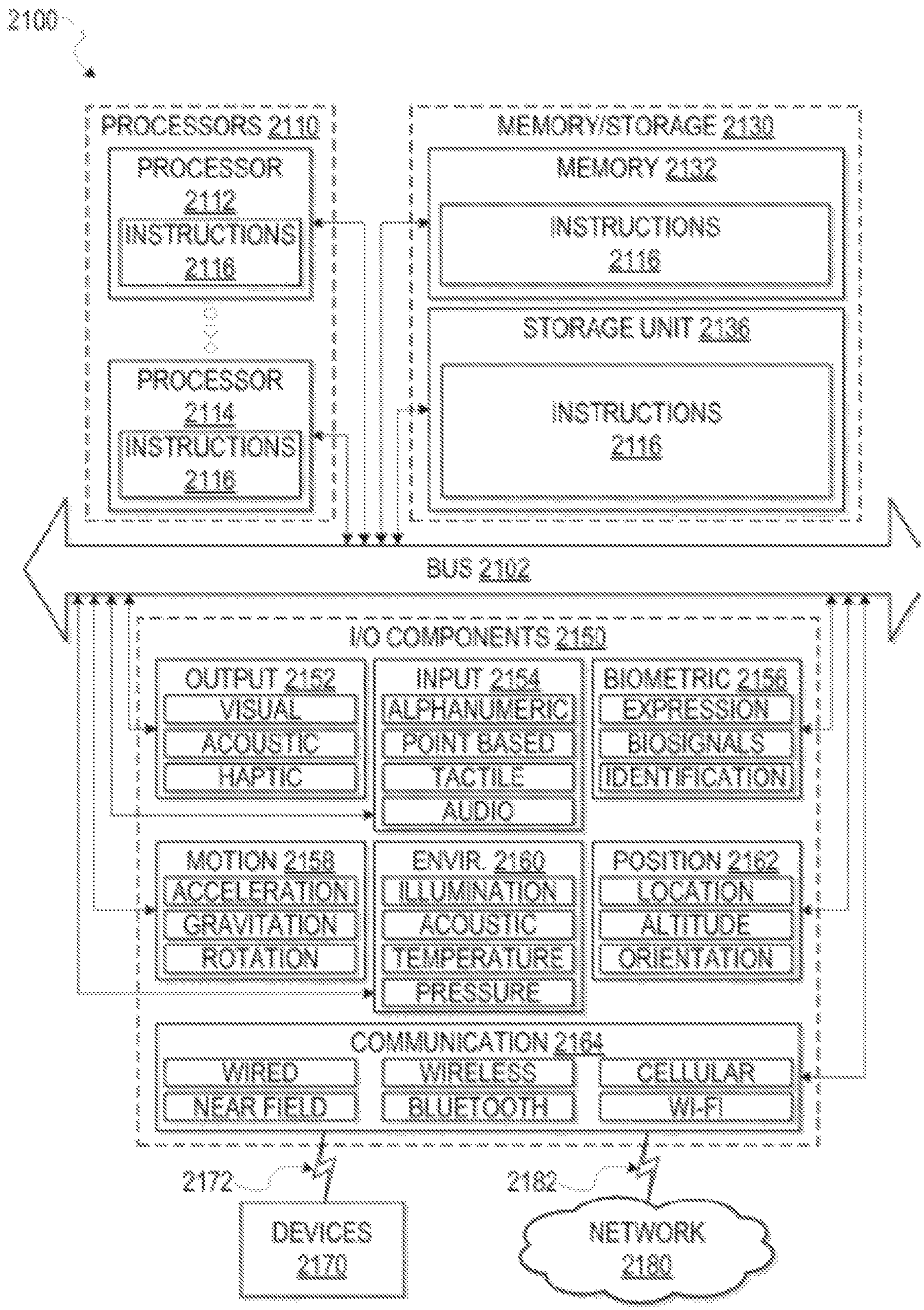
FIG. 15 is a block diagram illustrating components of a machine, according to some example embodiments, able to read instructions from a machine-readable medium (e.g., a machine-readable storage medium) and perform any one or more of the methodologies discussed herein.

FIG. 15 is a block diagram illustrating components of a machine 2100, according to some example embodiments, able to read instructions from a machine-readable medium (e.g., a machine-readable storage medium) and perform any one or more of the methodologies discussed herein. Specifically, FIG. 15 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein can be executed. Additionally, or alternatively, the instruction can implement the communication module 210, the presentation module 220, the finder module 230, the alignment module 240, the decoder module 250, the action module 260, or the encoder module 270 of FIG. 2, and so forth. The instructions transform the general, non-programmed machine into a particular machine programmed to carry out the described and illustrated functions in the manner described. In alternative embodiments, the machine 2100 operates as a standalone device or can be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 can comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by the machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 can include processors 2110, memory/storage 2130, and I/O components 2150, which can be configured to communicate with each other such as via a bus 2102. In an example embodiment, the processors 2110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, processor 2112 and processor 2114 that may execute instructions 2116. The term "processor" is intended to include multi-core processor that may comprise two or more independent processors (sometimes referred to as "cores") that can execute instructions contemporaneously. Although FIG. 15 shows multiple processors, the machine 2100 may include a single processor with a single core, a single processor with multiple cores (e.g., a multi-core processor), multiple processors with a single core, multiple processors with multiples cores, or any combination thereof.

The memory/storage 2130 can include a memory 2132, such as a main memory, or other memory storage, and a storage unit 2136, both accessible to the processors 2110 such as via the bus 2102. The storage unit 2136 and memory 2132 store the instructions 2116 embodying any one or more of the methodologies or functions described herein. The instructions 2116 can also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of the processors 2110 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by one or more processors of the machine 2100 (e.g., processors 2110), cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 can include a wide variety of components to receive input, provide output, produce output, transmit information, exchange information, capture measurements, and so on. The specific I/O components 2150 that are included in a particular machine will depend on the type of machine. For example, portable machines such as mobile phones will likely include a touch input device or other such input mechanisms, while a headless server machine will likely not include such a touch input device. It will be appreciated that the I/O components 2150 can include many other components that are not shown in FIG. 15. The I/O components 2150 are grouped according to functionality merely for simplifying the following discussion and the grouping is in no way limiting. In various example embodiments, the I/O components 2150 can include output components 2152 and input components 2154. The output components 2152 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 2150 can include biometric components 2156, motion components 2158, environmental components 2160, or position components 2162 among a wide array of other components. For example, the biometric components 2156 can include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 can include acceleration sensor components (e.g., an accelerometer), gravitation sensor components, rotation sensor components (e.g., a gyroscope), and so forth. The environmental components 2160 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 2162 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 2150 may include communication components 2164 operable to couple the machine 2100 to a network 2180 or devices 2170 via a coupling 2182 and a coupling 2172, respectively. For example, the communication components 2164 include a network interface component or other suitable device to interface with the network 2180. In further examples, communication components 2164 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 2170 may be another machine or any of a wide variety of peripheral devices (e.g., a peripheral device coupled via a USB).

Moreover, the communication components 2164 can detect identifiers or include components operable to detect identifiers. For example, the communication components 2164 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 2164, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 2180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 2180 or a portion of the network 2180 may include a wireless or cellular network, and the coupling 2182 may be a Code Division Multiple Access (CDMA) connection, a Global System for Mobile communications (GSM) connection, or other type of cellular or wireless coupling. In this example, the coupling 2182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2116 can be transmitted or received over the network 2180 using a transmission medium via a network interface device (e.g., a network interface component included in the communication components 2164) and utilizing any one of a number of well-known transfer protocols (e.g., HTTP). Similarly, the instructions 2116 can be transmitted or received using a transmission medium via the coupling 2172 (e.g., a peer-to-peer coupling) to devices 2170. The term "transmission medium" shall be taken to include any intangible medium that is capable of storing, encoding, or carrying the instructions 2116 for execution by the machine 2100, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A host device configured for pairing with a wearable device, the host device comprising:

a memory; and one or more processors coupled to the memory and configured to:

generate and initiate display of an image including a first optical code;

decode a pairing advertisement from the wearable device;

generate and display a second optical code, the second optical code comprising a host pairing advertisement code;

decode a second pairing advertisement including the host pairing advertisement code;

initiate the display of the first optical code during a first time period;

initiate a second display of the first optical code during a second time period different than the first time period;

initiate activation of a listening protocol on a wireless interface of the host device during the second time period associated with the second display of the first optical code;

process a third pairing advertisement broadcast by a second wearable device in response to the second wearable device detecting a third optical code from a second host device, wherein the second wearable device is different than the wearable device;

initiating display of a fourth optical code during a third time period, wherein the fourth optical code comprises a second host pairing advertisement code;

initiate activation of the listening protocol on the wireless interface of the host device during the fourth time period associated with the second display of the first optical code; and processing a fourth pairing advertisement to determine that a third host pairing advertisement code of the fourth pairing advertisement does not match the second host pairing advertisement code; and initiate deactivation of the listening protocol without establishing a connection to the second wearable device at an end of the third time period.

2. The host device of claim 1 wherein the one or more processors are further configured to:

in response to the second pairing advertisement, establish a communication channel between the host device and the wearable device;

receive, via the communication channel, a first key from the wearable device; and generate a second key in response to the first key;

communicate the second key to the wearable device from the host device via the communication channel; and establish an encrypted connection using the first key and the second key; wherein the encrypted connection is established using an application-level elliptic curve Diffie-Hellman (ECDH) exchange with the first key and the second key to establish a shared secret.

3. The host device of claim 2, wherein the one or more processors are further configured to:

generate a first keyed-hash message authentication code (HMAC) based on the shared secret, wherein the shared secret comprises a Diffie-Hellman Key (DHKey);

initiate transmission of the first HMAC to the wearable device;

process a second HMAC based on the DHKey received from the wearable device.

4. The host device of claim 3 wherein the one or more processors are further configured to generate a set of handshaking information following processing of the second HMAC; and initiate storing, in a memory coupled to the one or more processors, a set of handshaking information to enable a secure connection to be reestablished without optical code pairing.

5. The host device of claim 4 wherein the first optical code comprise a custom reference shape associated with a shape feature rule.

6. The host device of claim 5 wherein the shape feature rule is stored in the memory as part of a shared application environment operating on the host device and the wearable device.

7. The host device of claim 1 further comprising:

a touchscreen display coupled to the one or more processors, wherein the touchscreen display is configured to:

receive a second user input to initiate execution of a host portion of the shared application environment using the one or more processors;

display the first optical code in response to a second user input following the first input; and automatically display the second optical code in response to the second pairing advertisement.

8. The host device of claim 7 further comprising:

a wireless transceiver, wherein the wireless transceiver is configured to detect pairing advertisements only during display of a host optical code on the touchscreen display.

9. The host device of claim 7 wherein the one or more processors are configured to processes the pairing advertisement only while the first optical code is displayed on the touchscreen display.

10. The host device of claim 1, wherein the one or more processors are further configured to:

in response to decoding the second pairing advertisement, carry out an application-level elliptic curve Diffie-Hellman (ECDH) exchange to establish a shared secret and establish a secure connection between the wearable device and the host device.

11. The host device of claim 10, wherein the one or more processors are further configured to manage transmission of content from the wearable device to the host device across the secure connection; and initiate transmission of the content to a communication network.

12. A method for pairing a host device with a wearable device using optical codes, the method comprising:

initiating display of an image including a first optical code on a display of the host device;

decoding, by one or more processors of the host device, a pairing advertisement from the wearable device;

displaying a second optical code on the display e host device, the second optical code comprising a host pairing advertisement code;

decoding, using the one or more processors, a second pairing advertisement from the wearable device including the host pairing advertisement code;

initiating the display of the first optical code during a first time period;

initiating a second display of the first optical code during a second time period different than the first time period;

initiating activation of a listening protocol on a wireless interface of the host device during the second time period associated with the second display of the first optical code;

processing a third pairing advertisement broadcast by a second wearable device in response to the second wearable device detecting a third optical code from a second host device, wherein the second wearable device is different than the wearable device;

initiating display of a fourth optical code during a third time period, wherein the fourth optical code comprises a second host pairing advertisement code;

initiating activation of the listening protocol on the wireless interface of the host device during the fourth time period associated with the second display of the first optical code;

processing a fourth pairing advertisement to determine that a third host pairing advertisement code of the fourth pairing advertisement does not match the second host pairing advertisement code; and initiating deactivation of the listening protocol without establishing a connection to the second wearable device at an end of the third time period.

13. The method of claim 12 further comprising:

in response to the second pairing advertisement, establishing a communication channel between the host device and the wearable device;

receiving, via the communication channel, a first key from the wearable device; and generating a second key in response to the first key;

communicating the second key to the wearable device from the host device via the communication channel; and establishing an encrypted connection using the first key and the second key, wherein the encrypted connection is established using an application-level elliptic curve Diffie-Hellman (ECDH) exchange with the first key and the second key to establish a shared secret.

14. The host device of claim 13 further comprising:

generating, by the host device, a first keyed-hash message authentication code (HMAC) based on the shared secret, wherein the shared secret comprises a Diffie-Hellman Key (DHKey);

initiating, by the one or more processors of the host device, transmission of the first HMAC to the wearable device;

process, using the one or more processors, a second HMAC based on the DHKey received from the wearable device;

generating a set of handshaking information following processing of the second HMAC; and storing, in a memory coupled to the one or more processors, a set of handshaking information to enable a secure connection to be reestablished without optical code pairing.

15. The method of claim 12 wherein the first optical code comprise a custom reference shape associated with a shape feature rule, and wherein the shape feature rule is stored in a memory of the host device as part of a shared application environment operating on the host device and the wearable device.

16. A non-transitory computer readable medium comprising instructions that, when executed by one or more processors of a host device, cause the host device to perform a method for device pairing using optical codes, the method comprising:

initiating display of an image including a first optical code on a display of the host device;

decoding, by one or more processors of the host device, a pairing advertisement from the wearable device;

displaying a second optical code on the display of the host device, the second optical code comprising a host pairing advertisement code; and decoding, using the one or more processors, a second pairing advertisement from the wearable device including the host pairing advertisement code;

initiating the display of the first optical code during a first time period;

initiating a second display of the first optical code during a second time period different than the first time period;

initiating activation of a listening protocol on a wireless interface of the host device during the second time period associated with the second display of the first optical code;

processing a third pairing advertisement broadcast by a second wearable device in response to the second wearable device detecting a third optical code from a second host device, wherein the second wearable device is different than the wearable device;

initiating display of a fourth optical code during a third time period, wherein the fourth optical code comprises a second host pairing advertisement code;

initiating activation of the listening protocol on the wireless interface of the host device during the fourth time period associated with the second display of the first optical code;

processing a fourth pairing advertisement to determine that a third host pairing advertisement code of the fourth pairing advertisement does not match the second host pairing advertisement code; and initiating deactivation of the listening protocol without establishing a connection to the second wearable device at an end of the third time period.

17. The non-transitory computer readable medium of claim 16 wherein the instructions further cause the host device to perform operations comprising:

in response to the second pairing advertisement, establishing a communication channel between the host device and the wearable device;

receiving, via the communication channel, a first key from the wearable device; and generating a second key in response to the first key, communicating the second key to the wearable device from the host device via the communication channel; and establishing an encrypted connection using the first key and the second key, wherein the encrypted connection is established using an application-level elliptic curve Diffie-Hellman (ECDH) exchange with the first key and the second key to establish a shared secret.

18. The non-transitory computer readable medium of claim 17 wherein the instructions further cause the host device to perform operations comprising:

generating, by the host device, a first keyed-hash message authentication code (HMAC) based on the shared secret, wherein the shared secret comprises a Diffie-Hellman Key (DHKey);

initiating, by the one or more processors of the host device, transmission of the first HMAC to the wearable device;

process, using the one or more processors, a second HMAC based on the DHKey received from the wearable device;

generating a set of handshaking information following processing of the second HMAC; and storing, in a memory coupled to the one or more processors, a set of handshaking information to enable a secure connection to be reestablished without optical code pairing.

19. The non-transitory computer readable medium of claim 16 wherein the instructions further cause the host device to execute a host portion of a shared application environment operating on the host device and the wearable device; wherein the first optical code is displayed as part of the shared application environment.

20. The non-transitory computer readable medium of claim 16 wherein the first optical code comprise a custom reference shape associated with a shape feature rule, and wherein the shape feature rule is stored in a memory of the host device as part of a shared application environment operating on the host device and the wearable device.

* * * * *

UNITED STATES PATENT AND TRADEMARK OFFICE

CERTIFICATE OF CORRECTION

PATENT NO. : 10,581,608 B2
APPLICATION NO. : 15/716164
DATED : March 3, 2020
INVENTOR(S) : Brook et al.

It is certified that error appears in the above-identified patent and that said Letters Patent is hereby corrected as shown below:

In the Claims

In Column 31, Line 58, in Claim 12, delete “e” and insert --of the-- therefor

In Column 32, Line 40, in Claim 14, delete “host device” and insert --method-- therefor In Column 34, Line 3, in Claim 17, delete “key,” and insert --key;-- therefor Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*